(12) United States Patent
Wang et al.

(10) Patent No.: US 11,340,421 B2
(45) Date of Patent: May 24, 2022

(54) LENS MODULE AND LENS MODULE CONTROL METHOD

(71) Applicant: HUAWEI TECHNOLOGIES CO., LTD., Guangdong (CN)

(72) Inventors: Qingping Wang, Shenzhen (CN); Xiaogang Song, Munich (DE); Guosheng Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 16/912,063

(22) Filed: Jun. 25, 2020

(65) Prior Publication Data

US 2020/0326499 A1 Oct. 15, 2020

Related U.S. Application Data

(63) Continuation of application No. PCT/CN2018/123915, filed on Dec. 26, 2018.

(30) Foreign Application Priority Data

Dec. 27, 2017 (CN) .......................... 201711439999.X

(51) Int. Cl.
*G02B 7/09* (2021.01)
*G02B 3/14* (2006.01)
(Continued)

(52) U.S. Cl.
CPC .................. *G02B 7/09* (2013.01); *G02B 3/14* (2013.01); *G02B 7/36* (2013.01); *G03B 13/36* (2013.01);
(Continued)

(58) Field of Classification Search
CPC ...................................................... G02B 7/09
(Continued)

(56) References Cited

U.S. PATENT DOCUMENTS 5,517,238 A 5/1996 Hirasawa
5,796,531 A 8/1998 Kaneda et al.
(Continued)

FOREIGN PATENT DOCUMENTS

CN 1318766 A 10/2001
CN 1797168 A 7/2006
(Continued)

OTHER PUBLICATIONS

Notification of Rejection in Chinese Application No. 2020121402605640 dated Dec. 17, 2020.

*Primary Examiner* — Joel W Fosselman

(57) ABSTRACT

This application provides a lens module and a lens module control method to implement, among other features, automatic focusing and improve image definition. The lens module includes an imaging lens, a first control module, a first processing module, a liquid lens, and an image chip. The liquid lens is configured to refract an imaging beam that comes from the imaging lens, and the liquid lens comprises a transparent first flat lens and a transparent second flat lens that are parallel to each other. The first control module is configured to adjust a distance between the first flat lens and the second flat lens. The first processing module is configured to adjust a distance between the first flat lens and the second flat lens by using the first control module and based on a definition of the digital image, so as to adjust the definition of the image generated by the image chip.

15 Claims, 7 Drawing Sheets

(51) Int. Cl.
  *G02B 7/36* (2021.01)
  *G03B 13/36* (2021.01)
  *H04N 5/225* (2006.01)
  *H04N 5/232* (2006.01)
(52) U.S. Cl.
  CPC ....... *H04N 5/2254* (2013.01); *H04N 5/23212* (2013.01)
(58) Field of Classification Search
  USPC .......................................................... 348/349
  See application file for complete search history.

(56) References Cited

U.S. PATENT DOCUMENTS

| | | | |
|---|---|---|---|
| 8,649,103 | B2 | 2/2014 | Andreasch et al. |
| 9,980,639 | B2 | 5/2018 | Nauche et al. |
| 11,231,612 | B2 * | 1/2022 | Oh .......................... G06V 20/20 |
| 2013/0003188 | A1 | 1/2013 | Andreasch et al. |
| 2016/0331226 | A1 | 11/2016 | Nauche et al. |

FOREIGN PATENT DOCUMENTS

| | | |
|---|---|---|
| CN | 101390009 A | 3/2009 |
| CN | 201965249 U | 9/2011 |
| CN | 102591008 A | 7/2012 |
| CN | 102596002 A | 7/2012 |
| CN | 102792192 A | 11/2012 |
| CN | 104967263 A | 10/2015 |
| CN | 106413523 A | 2/2017 |
| CN | 107241545 A | 10/2017 |
| CN | 206714881 U | 12/2017 |
| JP | H01223413 A | 9/1989 |
| JP | H0210309 A | 1/1990 |
| JP | H06121221 A | 4/1994 |

* cited by examiner

1000

1100
An image chip generates a digital image based on an imaging beam refracted by a liquid lens 1200
A first processing module adjusts a distance between a first flat lens and a second flat lens by using a first control module and based on definition of the digital image, so as to adjust the definition of the image generated by the image chip

2000

An image chip generates a digital image based on an imaging beam emitted from a first rotary flat lens — 2100

The first processing module detects an angle by which the lens module rotates around a first direction — 2200

The first processing module adjusts, by using the second control module and based on the angle by which the lens module rotates around the first direction, an angle by which the first rotary flat lens rotates around the first direction, to adjust an angle by which the imaging beam that comes from the imaging lens deflects when passing through the first rotary flat lens, so as to compensate for vibration caused by the angle by which the lens module rotates around the first direction — 2300

FIG. 14

LENS MODULE AND LENS MODULE CONTROL METHOD

CROSS-REFERENCE TO RELATED APPLICATIONS

This application is a continuation of International Application No. PCT/CN2018/123915, filed on Dec. 26, 2018, which claims priority to Chinese Patent Application No. 201711439999.X, filed on Dec. 27, 2017. The disclosures of the aforementioned applications are hereby incorporated by reference in their entireties.

TECHNICAL FIELD

This application relates to the imaging field, and more specifically, to a lens module and a lens module control method.

BACKGROUND

Auto-focus is one of basic functions of a camera. Because a distance between a photographed object and an imaging lens is uncertain, if locations of the imaging lens relative to an image chip are not adjusted to perform optical imaging on photographed objects at different distances, some photographed images may be blurred. Therefore, a distance between the lens and the image chip needs to be adjusted based on a distance between a photographed object and the imaging lens, to improve image definition.

Currently, an auto-focus method is known. An object distance and an image distance are changed by driving an entire imaging lens group by a motor to move in an optical axis direction, so as to achieve a focusing effect and ensure imaging definition. However, if the imaging lens has a complex structure or is comparatively heavy, it is comparatively difficult to push the entire lens within a comparatively short time, and an auto-focus effect is also insignificant. Therefore, use of this method in a camera is limited to some extent.

SUMMARY

This application provides a lens module and a lens module control method, to improve image definition.

According to a first aspect, a lens module is provided. The lens module includes an imaging lens, a first control module, a first processing module, a liquid lens, and an image chip, where the liquid lens is located between the imaging lens and the image chip, the liquid lens is configured to refract an imaging beam that comes from the imaging lens, and emit a refracted imaging beam to the image chip, the liquid lens includes a transparent first flat lens and a transparent second flat lens that are parallel to each other, a transparent liquid object is filled between the first flat lens and the second flat lens, the first flat lens and the second flat lens are perpendicular to an optical axis of the imaging lens, the imaging beam that comes from the imaging lens is emitted from the first flat lens to the liquid lens, the imaging beam refracted by the liquid lens is emitted from the second flat lens, and refractive indexes of the first flat lens, the second flat lens, and the liquid object are greater than 1;

the first control module is configured to adjust a distance between the first flat lens and the second flat lens;

the image chip generates a digital image based on the imaging beam refracted by the liquid lens; and the first processing module adjusts the distance between the first flat lens and the second flat lens by using the first control module and based on definition of the digital image, so as to adjust the definition of the image generated by the image chip.

Therefore, by adjusting a thickness of the liquid object in the liquid lens, the lens module can adjust a thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

With reference to the first aspect, in some implementations of the first aspect, the lens module further includes:

a transparent first rotary flat lens, located between the imaging lens and the image chip, and configured to transmit the imaging beam refracted by the liquid lens or the imaging beam not refracted by the liquid lens; and a second control module, configured to adjust an angle by which the first rotary flat lens rotates around a first direction, so as to adjust an angle by which the imaging beam refracted by the liquid lens or the imaging beam not refracted by the liquid lens deflects when passing through the first rotary flat lens, where the first direction is perpendicular to the optical axis of the imaging lens; and the first processing module is further configured to detect an angle by which the lens module rotates around the second direction, and adjust, by using the second control module and based on the angle by which the lens module rotates around the first direction, the angle by which the first rotary flat lens rotates around the first direction, so as to compensate for vibration caused by the angle by which the lens module rotates around the first direction, where the second direction is perpendicular to the first direction, and the second direction is perpendicular to the optical axis.

The first processing module may determine a first rotation angle based on the angle by which the lens module rotates around the second direction, where the first rotation angle is an angle by which the first rotary flat lens is adjusted around the first direction relative to an angle of the first rotary flat lens at a previous detection moment, and the previous detection moment is a latest moment at which a rotation angle of the lens module is detected.

Therefore, the first rotary flat lens rotates around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

With reference to the first aspect, in some implementations of the first aspect, the lens module further includes:

a transparent second rotary flat lens, located between the imaging lens and the image chip, and configured to transmit the imaging beam refracted by the liquid lens or the imaging beam not refracted by the liquid lens; and a third control module, configured to adjust an angle by which the second rotary flat lens rotates around a second direction, so as to adjust an angle by which the imaging beam refracted by the liquid lens or the imaging beam not refracted by the liquid lens deflects when passing through the second rotary flat lens, where the first processing module is further configured to detect an angle by which the lens module rotates around the first direction, and adjust, by using the third control module and based on the angle by which the lens module rotates around the first direction, the angle by which the second rotary flat lens rotates around the second direction, so as to compensate for vibration caused by the angle by which the lens module rotates around the first direction.

Therefore, the first rotary flat lens rotates around the first direction to compensate for rotation of the lens module around the first direction, and the second rotary flat lens rotates around the second direction to compensate for rotation of the lens module around the second direction, so that possible drifts of an image point location in different directions in an exposure process can be avoided, and image stabilization can be maintained, thereby achieving an optical image stabilization effect and further ensuring image definition.

With reference to the first aspect, in some implementations of the first aspect, the first processing module is further configured to detect the angle by which the lens module rotates around the first direction and/or the angle by which the lens module rotates around the second direction; and is configured to adjust the distance between the first flat lens and the second flat lens by using the first control module and based on the angle by which the lens module rotates around the first direction and/or the angle by which the lens module rotates around the second direction, so as to adjust the definition of the image generated by the image chip.

During rotation of the lens module and the rotary lens group, originally horizontally incident signal light deflects due to rotation of the rotary lenses, so that an effective optical path of the signal light changes, and an image distance may change accordingly. Therefore, a slight drift may occur on an optimal imaging plane. In this case, a relative distance between the first flat lens and the second flat lens in the liquid lens may be adjusted to compensate for the drift occurring on the imaging plane, so as to improve an optical image stabilization effect and improve image quality.

With reference to the first aspect, in some implementations of the first aspect, the first processing module is further configured to perform image processing on the digital image, where the image processing includes at least noise reduction processing, enhancement processing, and blurring processing.

Therefore, a digital image obtained through image processing becomes more clearer, that is, image quality is further improved.

According to a second aspect, a lens module is provided, including an imaging lens, a transparent first rotary flat lens, an image chip, a first processing module, and a second control module, where the first rotary flat lens is located between the imaging lens and the image chip, and is configured to transmit an imaging beam that comes from the imaging lens, and emit the imaging beam that passes through the first rotary flat lens to the image chip;

the image chip is configured to generate a digital image based on the imaging beam emitted from the first rotary flat lens;

the second control module is configured to adjust an angle by which the first rotary flat lens rotates around a first direction, so as to adjust an angle by which the imaging beam that comes from the imaging lens defects when passing through the first rotary flat lens, where the first direction is perpendicular to an optical axis of the imaging lens; and the first processing module is configured to detect an angle by which the lens module rotates around the first direction, and adjust, by using the second control module and based on the angle by which the lens module rotates around the first direction, the angle by which the first rotary flat lens rotates around the first direction, so as to compensate for vibration caused by the angle by which the lens module rotates around the first direction.

Therefore, the first rotary flat lens rotates around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

With reference to the second aspect, in some implementations of the second aspect, the lens module further includes:

a transparent second rotary flat lens, located between the imaging lens and the image chip, and configured to transmit the imaging beam emitted from the first rotary flat lens or the imaging beam that comes from the imaging lens; and a third control module, configured to adjust an angle by which the second rotary flat lens rotates around a second direction, so as to adjust an angle by which the imaging beam emitted from the first rotary flat lens or the imaging beam that comes from the imaging lens deflects when passing through the second rotary flat lens, where the second direction is perpendicular to the first direction, and the second direction is perpendicular to the optical axis of the imaging lens; and the first processing module is further configured to detect an angle by which the lens module rotates around the second direction, and adjust, by using the third control module and based on the angle by which the lens module rotates around the second direction, the angle by which the second rotary flat lens rotates around the second direction, so as to compensate for vibration caused by the angle by which the lens module rotates around the second direction.

Therefore, the first rotary flat lens rotates around the first direction to compensate for rotation of the lens module around the first direction, and the second rotary flat lens rotates around the second direction to compensate for rotation of the lens module around the second direction, so that possible drifts of an image point location in different directions in an exposure process can be avoided, and image stabilization can be maintained, thereby achieving an optical image stabilization effect and further ensuring image definition.

With reference to the second aspect, in some implementations of the second aspect, the lens module further includes:

a liquid lens, located between the imaging lens and the image chip, and configured to refract the imaging beam that comes from the imaging lens or the imaging beam emitted from the first rotary flat lens, and emit a refracted imaging beam to the image chip, where the liquid lens includes a transparent first flat lens and a transparent second flat lens that are parallel to each other, a transparent liquid object is filled between the first flat lens and the second flat lens, the first flat lens and the second flat lens are perpendicular to the optical axis of the imaging lens, the imaging beam that comes from the imaging lens or the imaging beam emitted from the first rotary flat lens is emitted from the first flat lens to the liquid lens, the imaging beam refracted by the liquid lens is emitted from the second flat lens, and refractive indexes of the first flat lens, the second flat lens, and the liquid object are greater than 1;

the first control module is configured to adjust a distance between the first flat lens and the second flat lens; and the first processing module is further configured to adjust the distance between the first flat lens and the second flat lens by using the first control module and based on definition of the digital image, so as to adjust the definition of the image generated by the image chip.

Therefore, by adjusting a thickness of the liquid object in the liquid lens, the lens module can adjust a thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

With reference to the second aspect, in some implementations of the second aspect, the first processing module is further configured to adjust the distance between the first flat lens and the second flat lens by using the first control module and based on the detected angle by which the lens module rotates around the first direction and/or the detected angle by which the lens module rotates around the second direction, so as to adjust the definition of the image generated by the image chip.

During rotation of the lens module and the rotary lens group, originally horizontally incident signal light deflects due to rotation of the rotary lenses, so that an effective optical path of the signal light changes, and an image distance may change accordingly. Therefore, a slight drift may occur on an optimal imaging plane. In this case, a relative distance between the first flat lens and the second flat lens in the liquid lens may be adjusted to compensate for the drift occurring on the imaging plane, so as to improve an optical image stabilization effect and improve image quality.

According to a third aspect, a terminal device is provided. The terminal device is equipped with the lens module in any one of the first aspect to the second aspect or the possible implementations of the first aspect to the second aspect.

According to a fourth aspect, a lens module control method is provided, and is applied to a lens module. The lens module includes an imaging lens, a liquid lens, an image chip, a first processing module, and a first control module, where the liquid lens is located between the imaging lens and the image chip, and is configured to refract an imaging beam that comes from the imaging lens, and emit a refracted imaging beam to the image chip, the liquid lens includes a transparent first flat lens and a transparent second flat lens that are parallel to each other, a transparent liquid object is filled between the first flat lens and the second flat lens, the first flat lens and the second flat lens are perpendicular to an optical axis of the imaging lens, the imaging beam that comes from the imaging lens is emitted from the first flat lens to the liquid lens, the imaging beam refracted by the liquid lens is emitted from the second flat lens, and refractive indexes of the first flat lens, the second flat lens, and the liquid object are greater than 1; and the method includes:

generating, by the image chip, a digital image based on the imaging beam refracted by the liquid lens; and adjusting, by the first processing module, a distance between the first flat lens and the second flat lens by using the first control module and based on definition of the digital image, so as to adjust the definition of the image generated by the image chip.

Therefore, by adjusting a thickness of the liquid object in the liquid lens, the lens module can adjust a thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

With reference to the fourth aspect, in some implementations of the fourth aspect, the lens module further includes:

a transparent first rotary flat lens and a second control module, where the first rotary flat lens is located between the imaging lens and the image chip, and is configured to transmit the imaging beam refracted by the liquid lens or the imaging beam not refracted by the liquid lens; and the method further includes:

detecting, by the first processing module, an angle by which the lens module rotates around the first direction; and adjusting, by the first processing module by using the second control module and based on the angle by which the lens module rotates around the first direction, an angle by which the first rotary flat lens rotates around the first direction, to adjust an angle by which the imaging beam refracted by the liquid lens or the imaging beam not refracted by the liquid lens deflects when passing through the first rotary flat lens, so as to compensate for vibration caused by the angle by which the lens module rotates around the first direction, where the first direction is perpendicular to the optical axis of the imaging lens.

Therefore, the first rotary flat lens rotates around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

With reference to the fourth aspect, in some implementations of the fourth aspect, the lens module further includes a second rotary flat lens and a third control module, where the second rotary flat lens is located between the imaging lens and the image chip, and is configured to transmit the imaging beam refracted by the liquid lens or the imaging beam not refracted by the liquid lens; and the method further includes:

detecting, by the first processing module, an angle by which the lens module rotates around the second direction; and adjusting, by the first processing module by using the third control module and based on the angle by which the lens module rotates around the second direction, an angle by which the second rotary flat lens rotates around the second direction, to adjust an angle by which the imaging beam refracted by the liquid lens or the imaging beam not refracted by the liquid lens deflects when passing through the second rotary flat lens, so as to compensate for vibration caused by the angle by which the lens module rotates around the second direction, where the second direction is perpendicular to the optical axis of the imaging lens, and the second direction is perpendicular to the first direction.

Therefore, the first rotary flat lens rotates around the first direction to compensate for rotation of the lens module around the first direction, and the second rotary flat lens rotates around the second direction to compensate for rotation of the lens module around the second direction, so that possible drifts of an image point location in different directions in an exposure process can be avoided, and image stabilization can be maintained, thereby achieving an optical image stabilization effect and further ensuring image definition.

With reference to the fourth aspect, in some implementations of the fourth aspect, the method further includes:

detecting, by the first processing module, the angle by which the lens module rotates around the first direction and/or the angle by which the lens module rotates around the second direction; and adjusting, by the first processing module, the distance between the first flat lens and the second flat lens by using the first control module and based on the angle by which the lens module rotates around the first direction and/or the angle by which the lens module rotates around the second direction, so as to adjust the definition of the image generated by the image chip.

During rotation of the lens module and the rotary lens group, originally horizontally incident signal light deflects due to rotation of the rotary lenses, so that an effective optical path of the signal light changes, and an image distance may change accordingly. Therefore, a slight drift may occur on an optimal imaging plane. In this case, a relative distance between the first flat lens and the second flat lens in the liquid lens may be adjusted to compensate for the drift occurring on the imaging plane, so as to improve an optical image stabilization effect and improve image quality.

With reference to the fourth aspect, in some implementations of the fourth aspect, the method further includes:

performing, by the first processing module, image processing on the digital image, where the image processing includes at least noise reduction processing, enhancement processing, and blurring processing.

Therefore, a digital image obtained through image processing becomes more clear (i.e., image quality is further improved).

According to a fifth aspect, a lens module control method is provided, and is applied to a lens module. The lens module includes an imaging lens, a transparent first rotary flat lens, an image chip, and a second control module, where the first rotary flat lens is located between the imaging lens and the image chip, and is configured to transmit an imaging beam that comes from the imaging lens, emit the imaging beam that passes through the first rotary flat lens to the image chip, refract the imaging beam, and emit a refracted imaging beam to the image chip; and the method includes:

generating, by the image chip, a digital image based on the imaging beam emitted from the first rotary flat lens;

detecting, by the first processing module, an angle by which the lens module rotates around the first direction; and adjusting, by the first processing module by using the second control module and based on the angle by which the lens module rotates around the first direction, an angle by which the first rotary flat lens rotates around the first direction, to adjust an angle by which the imaging beam that comes from the imaging lens deflects when passing through the first rotary flat lens, so as to compensate for vibration caused by the angle by which the lens module rotates around the first direction, where the first direction is perpendicular to an optical axis of the imaging lens. Therefore, the first rotary flat lens rotates around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

With reference to the fifth aspect, in some implementations of the fifth aspect, the lens module further includes:

a transparent second rotary flat lens and a third control module, where the second rotary flat lens is located between the imaging lens and the image chip, and is configured to transmit the imaging beam emitted from the first rotary flat lens or the imaging beam that comes from the imaging lens; and the method further includes:

detecting, by the first processing module, an angle by which the lens module rotates around the second direction; and adjusting, by the first processing module by using the third control module and based on the angle by which the lens module rotates around the second direction, an angle by which the second rotary flat lens rotates around the second direction, to adjust an angle by which the imaging beam emitted from the first rotary flat lens or the imaging beam that comes from the imaging lens deflects when passing through the second rotary flat lens, so as to compensate for vibration caused by the angle by which the lens module rotates around the second direction, where the second direction is perpendicular to the first direction, and the second direction is perpendicular to the optical axis of the imaging lens.

Therefore, the first rotary flat lens rotates around the first direction to compensate for rotation of the lens module around the first direction, and the second rotary flat lens rotates around the second direction to compensate for rotation of the lens module around the second direction, so that possible drifts of an image point location in different directions in an exposure process can be avoided, and image stabilization can be maintained, thereby achieving an optical image stabilization effect and further ensuring image definition.

With reference to the fifth aspect, in some implementations of the fifth aspect, the lens module further includes a liquid lens and a first control module, where the liquid lens is located between the imaging lens and the image chip, and is configured to refract the imaging beam that comes from the imaging lens or the imaging beam emitted from the first rotary flat lens, and emit a refracted imaging beam to the image chip, the liquid lens includes a transparent first flat lens and a transparent second flat lens that are parallel to each other, a transparent liquid object is filled between the first flat lens and the second flat lens, the first flat lens and the second flat lens are perpendicular to the optical axis of the imaging lens, the imaging beam that comes from the imaging lens or the imaging beam emitted from the first rotary flat lens is emitted from the first flat lens to the liquid lens, the imaging beam refracted by the liquid lens is emitted from the second flat lens, and refractive indexes of the first flat lens, the second flat lens, and the liquid object are greater than 1; and the method further includes:

adjusting, by the first processing module, a distance between the first flat lens and the second flat lens by using the first control module and based on definition of the digital image, so as to adjust the definition of the image generated by the image chip.

Therefore, by adjusting a thickness of the liquid object in the liquid lens, the lens module can adjust a thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

With reference to the fifth aspect, in some implementations of the fifth aspect, the method further includes:

detecting, by the first processing module, the angle by which the lens module rotates around the first direction and/or the angle by which the lens module rotates around the second direction; and adjusting, by the first processing module, the distance between the first flat lens and the second flat lens by using the first control module and based on the angle by which the lens module rotates around the first direction and/or the angle by which the lens module rotates around the second direction, so as to adjust the definition of the image generated by the image chip.

During rotation of the lens module and the rotary lens group, originally horizontally incident signal light deflects due to rotation of the rotary lenses, so that an effective optical path of the signal light changes, and an image distance may change accordingly. Therefore, a slight drift may occur on an optimal imaging plane. In this case, a relative distance between the first flat lens and the second flat lens in the liquid lens may be adjusted to compensate for the drift occurring on the imaging plane, so as to improve an optical image stabilization effect and improve image quality.

With reference to the fifth aspect, in some implementations of the fifth aspect, the method further includes:

performing, by the first processing module, image processing on the digital image, where the image processing includes at least noise reduction processing, enhancement processing, and blurring processing.

Therefore, a digital image obtained through image processing becomes more clear (i.e., image quality is further improved).

According to a sixth aspect, a computer program product is provided. The computer program product includes a computer program (which may also be referred to as code or an instruction). When the computer program is run, a computer is enabled to perform the method in any one of the fourth aspect to the fifth aspect or the possible implementations of the fourth aspect to the fifth aspect.

According to a seventh aspect, a computer readable storage medium is provided. The computer readable storage medium stores a computer program (which may also be referred to as code or an instruction). When the computer program runs on a computer, the computer is enabled to perform the method in any one of the fourth aspect to the fifth aspect or the possible implementations of the fourth aspect to the fifth aspect.

According to an eighth aspect, a chip system is provided. The chip system includes a processor and a memory. The memory is configured to store a computer program. The processor is configured to invoke the computer program from the memory and run the computer program. The computer program is used to implement the method in any one of the fourth aspect to the fifth aspect or the possible implementations of the fourth aspect to the fifth aspect.

BRIEF DESCRIPTION OF DRAWINGS

FIG. 14 is a schematic flowchart of a lens module control method according to another embodiment of this application.

DESCRIPTION OF EMBODIMENTS

The following describes technical solutions of this application with reference to accompanying drawings.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

Figure 1:
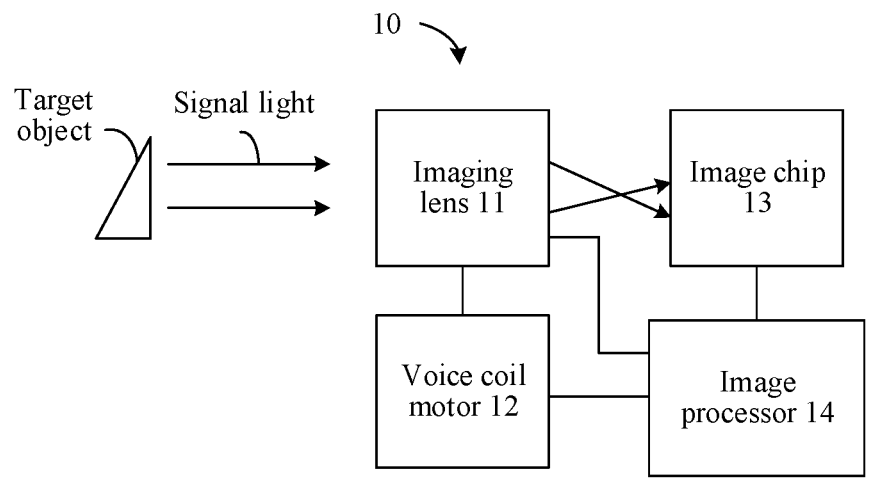
FIG. 1 is a schematic diagram of a possible lens module in the related art.

For ease of understanding, a specific optical imaging process in the related art is first briefly described with reference to FIG. 1. FIG. 1 is a schematic diagram of a possible lens module 10 in the related art. As shown in FIG. 1, the lens module 10 includes an imaging lens 11, a voice coil motor 12, an image chip (or referred to as an image sensor) 13, and an image processor 14. The imaging lens 11 may be obtained by combining one or more lenses, and the imaging lens 11 obtained through combination may have a light converging function similar to that of a convex lens. For example, the imaging lens 11 may include only a convex lens, or may be obtained by combining a convex lens and a concave lens, or may be obtained by combining a convex lens, a concave lens, and a flat lens. A specific form and quantity of lenses in the imaging lens 11 are not limited in this application. A photographed target object may be on one side of the imaging lens 11, and the image chip 13 may be on the other side of the imaging lens 11. The image chip 13 may be a photosensitive element, for example, a charge-coupled device (CCD). The image chip 13 may be opposite to the imaging lens 11, and may generate a digital image based on a received imaging beam. The image chip 13 may be communicatively connected to the image processor 14, and send the digital image to the image processor 14. The image processor 14 may be communicatively connected to the voice coil motor 12, and the image processor 14 may send an instruction to the voice coil motor 12 when detecting that definition of a frame of image is comparatively low, to push, by using the voice coil motor 12, the imaging lens 11 to move longitudinally in an optical axis direction, so as to implement auto-focus and improve image definition. In addition, the image processor 14 may be connected to the imaging lens 11 equipped with a gyroscope, and may send an instruction to the voice coil motor 12 when detecting that the lens module 10 vibrates, to drive, by using the voice coil motor 12, the imaging lens 11 or the image chip 13 to move horizontally on a plane perpendicular to the optical axis direction (that is, a plane on which the imaging lens 11 or the image chip 13 is located), so as to implement image stabilization, eliminate interference caused by vibration to image stabilization, and improve image definition.

For ease of understanding this application, the following first briefly describes several concepts in this application.

1. Auto-Focus:

For a lens module in which an imaging lens has a fixed relative location relationship, for example, a lens module configured in a mobile phone, focusing may be understood as implementing a change of an object distance and an image distance, to achieve a conjugate relationship and make imaging clear. This may be implemented by using a voice coil motor in the mobile phone to drive the lens group to move. In other words, in an auto-focus process, a focal length of the imaging lens may remain unchanged, and auto-focus is implemented by changing only an object distance and an image distance.

2. Optical Image Stabilization:

In an optical image stabilization technology, when detecting a tiny movement, a gyroscope in a lens module transmits a signal to an image chip to calculate a displacement that needs to be compensated for, and then a lens group is pushed to perform compensation based on the calculated displacement, so as to overcome image blurring caused by vibration of a camera.

3. Exposure:

Exposure is a process in which light enters a camera body through a lens after a camera shutter is opened, and then a photosensitive element is sensitized until the shutter is closed. In other words, an exposure process is an imaging process. An exposure time may be determined based on light, an aperture size, and preset light sensitivity during photographing. An aperture is used to control an amount of light that enters a photosensitive plane of the camera body through an imaging lens. A large aperture means that a large amount of light enters and the shutter is closed fast, that is, the exposure time is short; and vice versa.

It can be learned from the foregoing descriptions that, when an imaging lens has a comparatively complex structure or is comparatively heavy, it is comparatively difficult to implement auto-focus or optical image stabilization by using a voice coil motor to drive the imaging lens to move within a comparatively short exposure time. Consequently, use of the foregoing method is comparatively limited.

In view of this, this application provides a lens module to implement auto-focus and ensure image definition. In addition, an entire imaging lens does not need to be moved to implement auto-focus, so that the lens module can be widely applied to mobile terminals.

Figure 2:
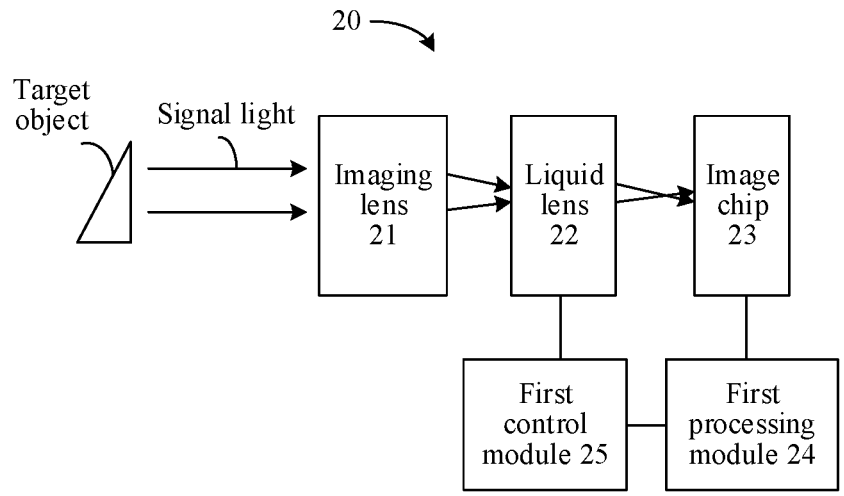
FIG. 2 is a schematic diagram 1 of a lens module according to an embodiment of this application.

FIG. 2 is a schematic diagram 1 of a lens module according to an embodiment of this application. As shown in FIG. 2, the lens module 20 includes an imaging lens 21, a liquid lens 22, an image chip 23, a first processing module 24, and a first control module 25.

The imaging lens 21 may be the same as an imaging lens in the prior art. For example, the imaging lens 21 may include a convex lens, or may be obtained by combining a convex lens, a concave lens, a flat lens, and the like. The imaging lens 21 has a light converging function.

Figure 3:
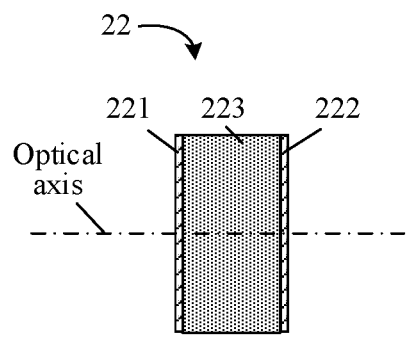
FIG. 3 is a schematic structural diagram of a liquid lens according to an embodiment of this application.

For a specific structure of the liquid lens 22, refer to FIG. 3. FIG. 3 is an example of a schematic structural diagram of a liquid lens according to an embodiment of this application. As shown in FIG. 3, the liquid lens 22 may include a transparent first flat lens 221 and a transparent second flat lens 222 that are parallel to each other, and the first flat lens 221 and the second flat lens 222 may be perpendicular to an optical axis of the imaging lens 21. A transparent liquid object 223 is filled between the first flat lens 221 and the second flat lens 222. The liquid object 223 may include a liquid and some colloidal fillers between a liquid and a solid. As a non-limiting example, the liquid object 223 may be mercury.

In addition, the first flat lens 221 and the second flat lens 222 may move relative to each other in an optical axis direction of the imaging lens 21. In other words, a thickness of the liquid object 223 filled between the first flat lens 221 and the second flat lens 222 is adjustable. In addition, the liquid object 223 is sealed in the liquid lens 22. To facilitate adjustment of the thickness between the first flat lens 221 and the second flat lens 223, a specific margin of storage space may be provided on the liquid lens 22. Therefore, when a relative distance between the first flat lens 221 and the second flat lens 223 needs to be decreased, a liquid is discharged to the storage space, and when the thickness between the first flat lens 221 and the second flat lens 223 needs to be increased, a liquid is supplemented from the storage space.

In the following embodiments, for ease of description, the relative distance between the first flat lens and the second flat lens may be referred to as a thickness of the liquid lens for short.

In this embodiment of this application, the imaging lens 21 may be located between a photographed target object and the liquid lens 22. In other words, the target object may be located in front of the imaging lens, and the liquid lens 22 may be located behind the imaging lens 21 and opposite to the imaging lens 21. The liquid lens 22 may be located between the imaging lens 21 and the image chip 23, and the liquid lens 22 may be opposite to the imaging lens 21.

The liquid lens 22 may be configured to emit an imaging beam, that comes from the imaging lens 21, from the first flat lens 221 to the liquid lens 22, and an imaging beam refracted by the liquid lens 22 is emitted from the second flat lens 222. The image chip 23 may be configured to generate a digital image based on the imaging beam refracted by the liquid lens 22.

Refractive indexes of the first flat lens 221, the second flat lens 222, and the liquid object 223 in the liquid lens 22 are all greater than 1. Optionally, the refractive indexes of the first flat lens 221, the second flat lens 222, and the liquid object 223 are all greater than 1 and less than 3.

It should be understood that the refractive indexes of the first flat lens 221, the second flat lens 222, and the liquid object 223 herein are merely a possible value range, and shall not constitute any limitation on this application. Actually, the refractive indexes of the first flat lens 221, the second flat lens 222, and the liquid object 223 may be greater than a refractive index of an environment (for example, the air) in which the lens module is located. In other words, materials of the first flat lens 221, the second flat lens 222, and the liquid object 223 may all meet the following condition: A refractive index is greater than the refractive index of the environment in which the lens module is located. In addition, the refractive indexes of the first flat lens 221, the second flat lens 222, and the liquid object 223 may be the same as or different from each other. This is not limited in this application.

Optionally, the image chip 23 includes a charge-coupled device (CCD) or a complementary metal oxide semiconductor (CMOS).

It should be noted that a distance between the imaging lens 21 and the image chip 23 may be referred to as a mechanical back focal length. In other words, the liquid lens 22 is located in a range of the mechanical back focal length of the lens module. The image chip 23 may be located behind the liquid lens 22, and the image chip 23 may be communicatively connected to the first processing module 24. The image chip 23 may be configured to receive the imaging beam from the liquid lens 22. After generating the digital image based on the received imaging beam, the image chip 23 may send the digital image to the first processing module 24.

The first processing module 24 may be configured to adjust the distance between the first flat lens 221 and the second flat lens 222 by using the first control module 25 and based on definition of the digital image, so as to adjust the definition of the image generated by the image chip 23.

The first control module 25 may be configured to adjust the distance between the first flat lens 221 and the second flat lens 222. Optionally, the first control module 25 may include a motor. The motor is configured to drive at least one of the first flat lens 221 and the second flat lens 222 in the liquid lens 22 to move in the optical axis direction, so as to adjust the distance between the first flat lens 221 and the second flat lens 222.

Herein, a distance that is between the first flat lens 221 and the second flat lens 222 and by which adjustment is performed by the first processing module 24 by using the first control module 25 may be, for example, a relative variation relative to a distance between the first flat lens 221 and the second flat lens 222 at a photographing moment of a previous frame of image.

The first control module 25 may be communicatively connected to the first processing module 24. When the first processing module 24 determines that the distance between the first flat lens 221 and the second flat lens 222 (that is, the thickness of the liquid lens 22) needs to be adjusted, an output current or an output voltage of the first control module 25 may be determined based on a distance by which adjustment needs to be performed.

It should be noted that, that the first control module 25 driving at least one of the first flat lens 221 and the second flat lens 222 in the liquid lens 22 to move in the optical axis direction may be implemented by changing the output current or the output voltage of the first control module 25. In a possible implementation, a displacement of a flat lens (for example, the first flat lens 221 or the second flat lens 222) in the optical axis direction may be in a linear relationship with the output current or the output voltage of the first control module 25. For example, the output voltage remains unchanged, and the output current is changed to drive the flat lens to move; or the output current remains unchanged, and the output voltage is changed to drive the flat lens to move. The first processing module 24 may determine the output current or the output voltage of the first control module 25 based on the distance by which adjustment needs to be performed, and send an instruction to the first control module 25, to notify the output current or the output voltage of the first control module 25 by using the instruction, so as to drive, by using the output current or the output voltage of the first control module 25, the distance between the first flat lens and the second flat lens in the liquid lens to change.

It should be understood that the foregoing method for determining the output current or the output voltage of the first control module based on the distance by which adjustment needs to be performed is a possible implementation of driving, by using the motor, the flat lens to move. A specific implementation process may be the same as that in the prior art. In addition, the method is merely an example for description, and shall not constitute any limitation on this application. A specific method for driving the first flat lens and/or the second flat lens in the liquid lens by using the motor may be similar to a specific method for driving, by using a voice coil motor, a lens to move in an optical axis direction in the prior art.

The first processing module 24 may determine, based on received information about a digital image, for example, a contrast, whether the digital image is clear. For example, whether the digital image is clear may be determined by comparing a relationship between the information about the digital image and a preset threshold. When definition of the digital image is comparatively low, a thickness value by which the liquid lens needs to be adjusted may be calculated by using a focusing algorithm. In a possible design, the first processing module 24 may send the information about the digital image to a focusing algorithm library, and the focusing algorithm library may first attempt to increase (or decrease) the thickness of the liquid lens, for example, first increase the thickness of the liquid lens by 1 micrometer. Further, the first control module 25 drives the first flat lens and/or the second flat lens in the liquid lens to move, so that the thickness of the liquid lens is increased by 1 micrometer. Then the image chip 23 may receive an imaging beam emitted by the liquid lens with the thickness-adjusted liquid object, generate a new frame of digital image, and send information about the newly generated frame of digital image to the first processing module 24. The first processing module 24 may send the information about the newly generated frame of digital image to the focusing algorithm library. The focusing algorithm library may compare the information about the newly generated frame of digital image with information about a previous frame of digital image, to determine whether to further increase the thickness of the liquid object in the liquid lens, or whether reverse adjustment is required. For example, if a contrast of the newly generated digital image is higher than a contrast of the previous frame of digital image, whether a preset contrast threshold is satisfied may be further determined. If the preset contrast threshold is satisfied, no further adjustment is required; or if the preset contrast threshold is not satisfied, the thickness of the liquid lens may be further increased for an attempt, for example, increased by 0.5 micrometers. Then the foregoing process is cyclically performed. On the contrary, if the contrast of the newly generated digital image is lower than the contrast of the previous frame of digital image, the thickness of the liquid lens may be adjusted reversely, for example, decreased (or increased) by 2 micrometers. Further, the first flat lens and/or the second flat lens in the liquid lens are/is driven to move, so that the thickness of the liquid lens is decreased. Then the image chip 23 may receive an imaging beam emitted by the liquid lens with the thickness-adjusted liquid object, generate a new frame of digital image, and send information about the newly generated frame of digital image to the first processing module 24. The first processing module 24 may send the information about the newly generated frame of digital image to the focusing algorithm library. The focusing algorithm library may cyclically perform the foregoing process. After a plurality of cycles, an image may undergo a blurred-clear-blurred change process. The change process may be reflected by image information. For example, a contrast of the image may undergo a low-high-low change process, and then a thickness of the liquid lens that is obtained when the contrast reaches a maximum value is determined as a finally usable thickness.

It should be noted that the information about the image may include a value of a pixel in the image, and the value of the pixel may be represented by, for example, a red-green-blue (RGB) value or a YUV value (where Y represents luminance (or luma), and U and V represent chrominance (or chroma)). The information about the image may further include a parameter used to represent whether the image is clear, for example, a contrast or a grayscale value. It should be understood that the foregoing specific content of the information about the image is merely an example for description, and shall not constitute any limitation on this application. Specific content of information about an image is not limited in this application.

It should be understood that, in the foregoing process of determining the distance that is between the first flat lens and the second flat lens in the liquid lens and by which adjustment needs to be performed, the first processing module 24 may determine, based on a plurality of types of possible image information such as a contrast or a phase of one or more points in the image, the distance that is between the first flat lens and the second flat lens and by which adjustment needs to be performed. The foregoing method is merely a possible implementation, and shall not constitute any limitation on this application.

It should be further understood that the first processing module 24 may implement auto-focus based on the definition of the digital image, where the definition of the image may be evaluated by using a definition evaluation function in the prior art. As a non-limiting example, commonly used definition evaluation functions include: a frequency domain function, where better focusing, more high-frequency parts, and more details indicate a clearer image; a grayscale function, where better focusing, a larger difference from a surrounding grayscale point, and a clearer edge indicate a clearer image; an information entropy function, where better focusing, a larger information entropy included in an image, and a larger amount of information included indicate a clearer image; and/or a statistical function, where better focusing and higher histogram diversity indicate a clearer image.

It should be further noted that the foregoing functions of the focusing algorithm library may be performed on hardware, for example, hardware configured to perform the functions of the first processing module 24, or may be performed by driver software. This is not limited in this application. It should be further understood that, for the focusing algorithm, reference may be made to the prior art.

Figure 4:
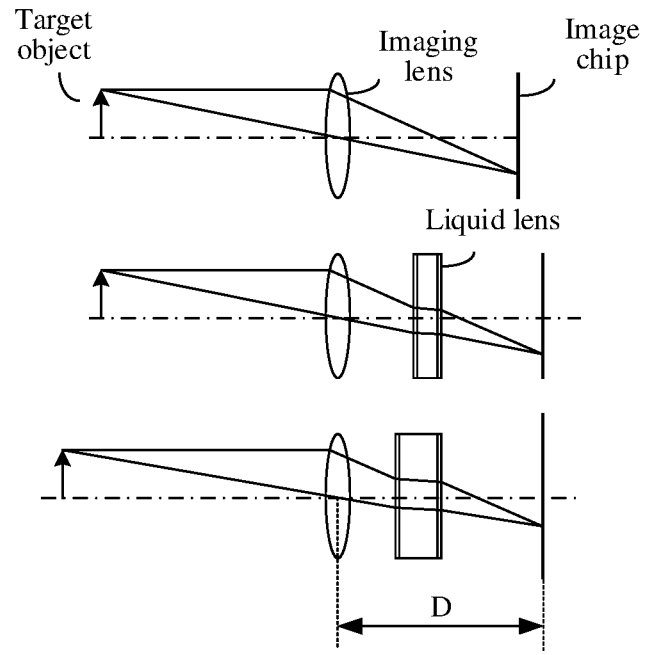
FIG. 4 is a schematic diagram of separately taking a distant shot and a close shot by using a lens module according to an embodiment of this application.

FIG. 4 is a schematic diagram of separately taking a distant shot and a close shot by using a lens module according to an embodiment of this application. First, it can be learned from FIG. 4 that, when a same target object is photographed, disposing the liquid lens in the lens module causes a change of an image distance. A lens of the liquid lens is a flat lens, and has no function of converging or diverging signal light. However, when the liquid lens is disposed behind the imaging lens, because signal light converged by the imaging lens may be refracted on an interface when entering the liquid lens, and a refractive index of the signal light in the liquid lens is greater than a refractive index of the signal light in the air, after the signal light enters the liquid lens, a convergence angle of the signal light in the liquid lens is smaller than that in the air. In addition, a refractive index of the liquid lens is greater than a refractive index of the air, so that an optical path required for converging the signal light at a point changes, to match different image distances.

If the liquid lens is disposed between the imaging lens and the image chip, a distance between the imaging lens and the image chip (that is, a mechanical back focal length) is D (D>0), and an effective optical path of the signal light from the imaging lens to the image chip (for example, denoted as L) may include an effective optical path in the air (for example, denoted as $L_1$) and an effective optical path in the liquid lens (for example, denoted as $L_2$). In this case, $L=L_1+L_2$, where $L_1=D_1/\gamma_1$, $L_2=D_2/\gamma_2$, $D_2$ is the thickness of the liquid lens, and $D_1=D-D_2$. $\gamma_1$ is a refractive index of the signal light in an environment in which the lens module is located, and $\gamma_2$ is a refractive index of the signal light in the liquid lens. If the environment in which the lens module is located is the air, $\gamma_1=1$, and $\gamma_2>1$. That is, $L=D_1+D_2/\gamma_2$. It can be learned that, when an object distance and the mechanical back focal length D are fixed, an effective optical path of signal light in a lens module not equipped with a liquid lens is greater than an effective optical path of signal light in the lens module equipped with the liquid lens, and as the thickness of the liquid lens increases, the effective optical path decreases. Therefore, the effective optical path of the signal light between the imaging lens and the image chip may be decreased to match a smaller image distance, and the effective optical path of the signal light between the imaging lens and the image chip may be increased to match a larger image distance.

It is assumed that in the lens module provided in this embodiment of this application, the distance D between the imaging lens and the image chip is fixed when a distance between the imaging lens and the photographed target object is any value.

A person skilled in the art can understand that if no liquid lens is disposed in the lens module, D needs to be decreased when a distant shot is taken, and D needs to be increased when a close shot is taken. In this embodiment of this application, the liquid lens is disposed between the imaging lens and the image chip. When a distant shot is taken, D needs to be decreased if the thickness of the liquid lens is not changed. When a close shot is taken, D needs to be increased if the thickness of the liquid lens is not changed. On the contrary, when a distant shot is taken, a comparatively large thickness of the liquid lens may be used if D is not changed (as shown, for example, in FIG. 4); and when a close shot is taken, a comparatively small thickness of the liquid lens may be used if D is not changed (as shown, for example, in FIG. 4). It can be understood that changing the thickness of the liquid lens between the imaging lens and the image chip is changing the optical path required for converging the signal light at a point, where the optical path may include the effective optical path of the signal light in the air and the effective optical path of the signal light in the liquid lens.

It should be understood that, merely for ease of understanding, the foregoing describes, by using convex lens imaging as an example and with reference to the accompanying drawings, a process of achieving an auto-focus effect by adjusting the thickness of the liquid lens; however, this shall not constitute any limitation on this application. A specific lens included in the imaging lens and a specific quantity of lenses included in the imaging lens are not limited in this application.

Therefore, in this embodiment of this application, by adjusting the thickness of the liquid object in the liquid lens, the lens module can adjust the thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

Figure 5:
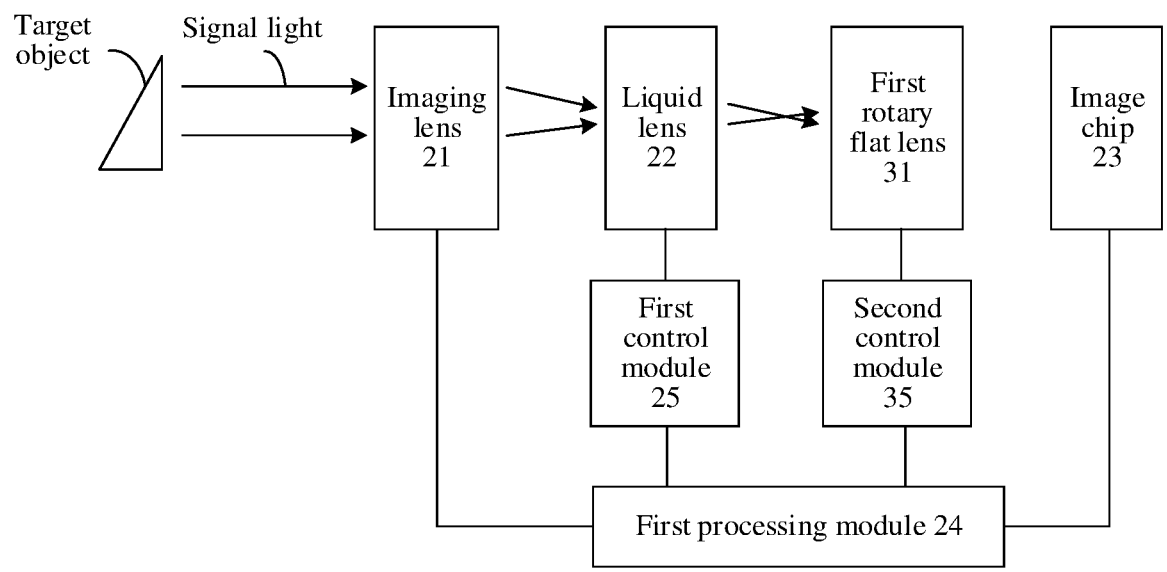
FIG. 5 is a schematic diagram 2 of a lens module according to an embodiment of this application.

FIG. 5 is a schematic diagram 2 of a lens module 20 according to an embodiment of this application. Optionally, as shown in FIG. 5, the lens module 20 further includes a transparent first rotary flat lens 31 and a second control module 35.

The first rotary flat lens 31 may be located between the imaging lens 21 and the image chip 23, that is, the first rotary flat lens 31 may be located in a range of the mechanical back focal length of the lens module 20. The first rotary flat lens 31 may be configured to transmit the imaging beam refracted by the liquid lens 22 or the imaging beam not refracted by the liquid lens 22. In other words, the first rotary flat lens 31 may be located between the liquid lens 22 and the image chip 23, or may be located between the imaging lens 21 and the liquid lens 22. When the first rotary flat lens 31 is located between the liquid lens 22 and the image chip 23, a received imaging beam is the imaging beam refracted by the liquid lens 22. When the first rotary flat lens 31 is located between the imaging lens 21 and the liquid lens 22, a received imaging beam is the imaging beam not refracted by the liquid lens 22. In addition, the first rotary flat lens 31 may rotate around a first direction. Herein, the first direction is perpendicular to the optical axis of the imaging lens.

It should be understood that the first rotary flat lens 31 may be a flat lens that is configured between the imaging lens 21 and the image chip 23 and that can rotate around the first direction, or may be any one of a group of parallel flat lenses that are configured between the imaging lens 21 and the image chip 23 and that can rotate around the first direction. A specific quantity of flat lenses that can rotate around the first direction is not limited in this application.

Vibration of the lens module 20 may be caused by rotation of the lens module 20 around the first direction. The first processing module 24 may be further configured to detect an angle by which the lens module 20 rotates around the first direction. In a possible design, a gyroscope (also referred to as an angular velocity sensor) may be configured in the lens module 20. For example, a gyroscope is configured in the imaging lens 21. The gyroscope may be configured to detect whether the imaging lens 21 deflects around the first direction. The first processing module 24 may be communicatively connected to the imaging lens 21. When detecting that the imaging lens 21 deflects around the first direction, the gyroscope may notify the first processing module 24 of a detected deflection angle.

The first processing module 24 may be communicatively connected to the second control module 35, and the second control module 35 may be communicatively connected to the first rotary flat lens 31.

The first processing module 24 may be further configured to determine, based on the angle by which the lens module 20 rotates around the first direction, an angle by which the first rotary flat lens 31 needs to be adjusted. In addition, the second control module 35 adjusts the first rotary flat lens 31 to rotate around the first direction, so as to compensate for vibration caused by the angle by which the lens module 20 rotates around the first direction. The second control module 35 may be configured to adjust an angle by which the first rotary flat lens 31 rotates around the first direction, so as to adjust an angle by which the imaging beam refracted by the liquid lens 22 or the imaging beam not refracted by the liquid lens 22 is refracted when passing through the first rotary flat lens 31.

For ease of differentiation and description, the angle by which the first rotary flat lens 31 needs to be adjusted may be denoted as a first rotation angle. For example, the first rotation angle may be a relative variation relative to an angle of the first rotary flat lens 31 at a previous detection moment, or an angle by which adjustment is performed relative to a location of the first rotary flat lens 31 at a previous detection moment. The first processing module 24 may determine an output current or an output voltage of the second control module 35 based on the angle by which adjustment needs to be performed.

It should be noted that, that the second control module 35 drives the first rotary flat lens 31 to rotate around the first direction may be implemented by changing the output current or the output voltage of the second control module 35. In a possible implementation, an angle by which a flat lens (for example, the first rotary flat lens 31) rotates around the first direction may be in a linear relationship with the output current or the output voltage of the second control module 35. For example, the output voltage remains unchanged, and the output current is changed to drive the flat lens to rotate; or the output current remains unchanged, and the output voltage is changed to drive the flat lens to rotate. The first processing module 24 may determine the output current or the output voltage of the second control module 35 based on the angle by which adjustment needs to be performed, and send an instruction to the second control module 35, to notify the output current or the output voltage of the second control module 35 by using the instruction, so as to drive, by using the output current or the output voltage of the second control module 35, the first rotary flat lens 31 to rotate around the first direction.

It should be understood that the foregoing method for determining the output current or the output voltage of the second control module based on the angle by which adjustment needs to be performed is a possible implementation of driving, by using the motor, the flat lens to rotate. A specific implementation process may be the same as that in the prior art. In addition, the method is merely an example for description, and shall not constitute any limitation on this application. A specific method for driving, by using the motor, the first rotary flat lens 31 to rotate around the first direction may be similar to a specific method for driving, by using a voice coil motor, a lens to move in an optical axis direction in the prior art.

In a photographing process, if the lens module 20 vibrates, a photographed image may be blurred. Within an exposure time of a frame of image, if the imaging lens 21 vibrates at a moment, a location of a same image point in an obtained digital image drifts, and a blurred image may be presented.

To ensure image definition, in the lens module 20 provided in this application, the first rotary flat lens 31 rotates to compensate for an image point location drift caused by vibration of the lens module 20, so as to implement optical image stabilization.

Figure 6:
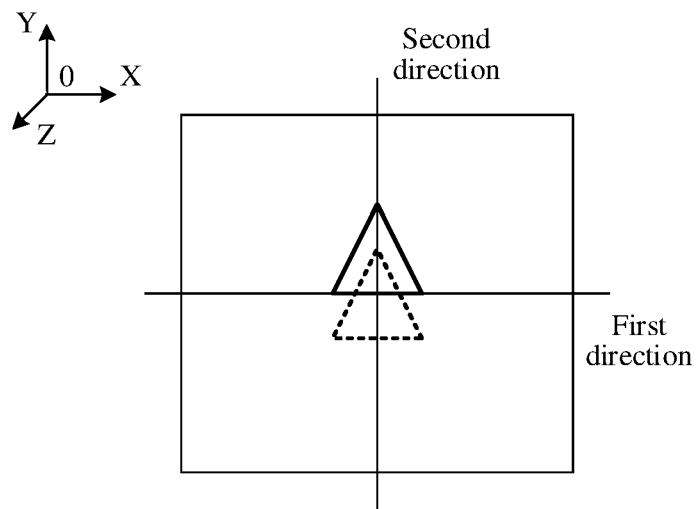
FIG. 6 and FIG. 7 are schematic diagrams of implementing optical image stabilization by a lens module according to an embodiment of this application.
Figure 7:
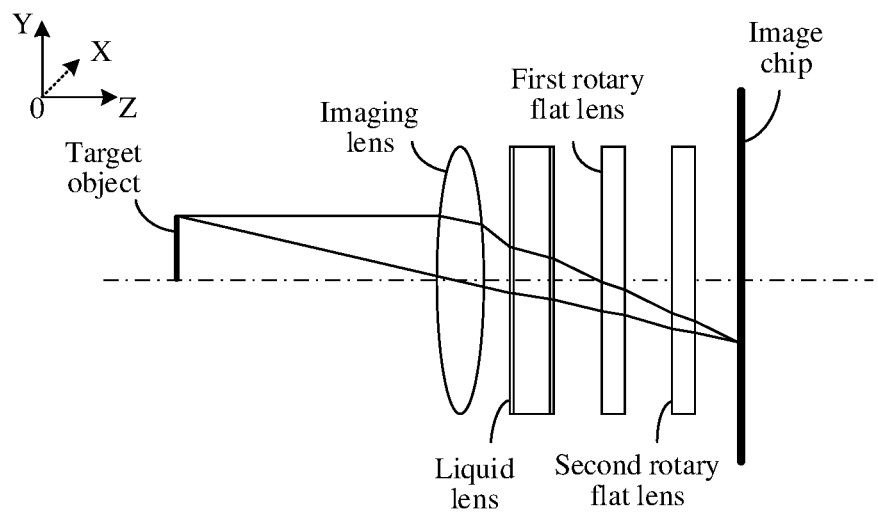
Figure 7:
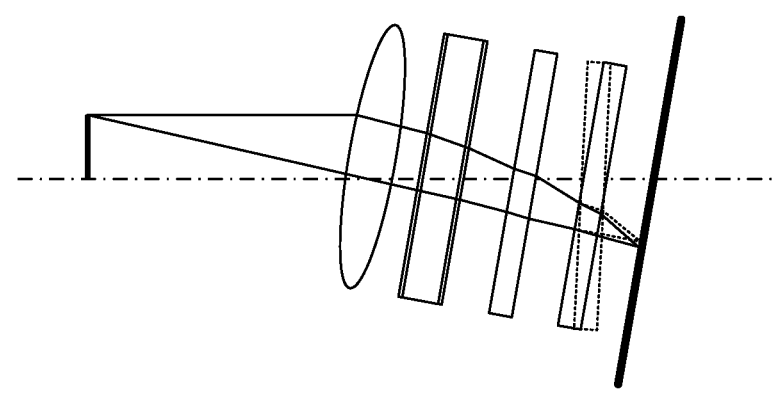

FIG. 6 and FIG. 7 are schematic diagrams of implementing optical image stabilization by a lens module according to an embodiment of this application. It should be noted that in the schematic diagrams shown in FIG. 6 and FIG. 7, an X-axis direction may be the first direction, and a Z-axis direction may be the optical axis direction. In this case, a Y-axis direction is perpendicular to the first direction, and the Y-axis direction is perpendicular to the optical axis direction.

FIG. 6 shows a location at which an imaging beam is converged to the image chip when the lens module does not vibrate and a location at which an imaging beam is converged to the image chip when vibration is caused by rotation of the lens module around the first direction. It is assumed that a target object is a triangle. A solid-line triangle in the figure is a schematic diagram of a location at which the target object is converged to the image chip through the imaging lens 21 when the lens module 20 does not vibrate. A dashed-line triangle in the figure is a schematic diagram of a location at which the target object is converged to the image chip through the imaging lens 21 when the lens module 20 rotates around the first direction. It can be learned that if the lens module 20 rotates around the first direction, a location at which a same object point is converged to the image chip through the imaging lens 21 may be shifted in the Y-axis direction. As shown in the figure, because a same image point location in the photographed frame of image is shifted (in other words, drifted) downward due to vibration of the lens module 20, definition of a digital image obtained through conversion may be finally low.

It should be understood that FIG. 6 is merely a schematic diagram for ease of understanding of a location at which an imaging beam is converged to the image chip when the lens module vibrates and a location at which an imaging beam is converged to the image chip when the lens module does not vibrate. However, this does not mean that the lens module generates a plurality of optical images within an exposure time of one frame of image.

FIG. 7 is a schematic diagram of an optical path when the lens module does not vibrate and an optical path when the lens module rotates around the first direction. When the lens module 20 rotates around the first direction, the first rotary flat lens 31 may rotate around the first direction for compensation, so that an image point location originally deviated downward is shifted upward, to ensure image stabilization. When the lens module 20 rotates clockwise around the first direction by a comparatively small angle, and when same signal light enters the imaging lens 20, an incident angle is increased compared with that when the imaging lens 20 does not vibrate. After the signal light is refracted by the imaging lens 20, an emergent direction is more downward deviated than that when the imaging lens 20 does not vibrate, and consequently, an image point location at which a same object point is converged to the image chip through the imaging lens 21 is shifted downward. In this case, the first rotary flat lens 31 may rotate counterclockwise around the first direction for compensation, so that the signal light originally deviated downward is shifted upward, and the image point location originally deviated downward is also shifted upward, thereby ensuring image stabilization.

When detecting, at a moment (for example, denoted as a detection moment), that the imaging lens 21 deflects around the first direction, the gyroscope may send a deflection angle of the imaging lens 21 to the first processing module 24. The first processing module 24 may determine, based on the deflection angle, an angle by which the first rotary flat lens 31 needs to be adjusted (that is, a first rotation angle), where the first rotation angle may be used to compensate for an image offset caused by rotation of the imaging lens 21 around the first direction; and may further determine an output current or an output voltage of the second control module 35 based on the first rotation angle. Therefore, it can be understood that the first rotation angle may be an angle by which the first rotary flat lens 31 needs to rotate relative to an angle of the first rotary flat lens 31 at a previous detection moment, and rotation of the first rotation angle may be completed within a response time.

The first rotation angle may be determined by using an existing optical image stabilization algorithm. In a possible implementation, assuming that the gyroscope detects that a rotation angle of the lens module in the first direction is γ, an image point offset f·tan γ may be calculated according to an optical principle, where f is a focal length of the imaging lens. Therefore, it can be learned that a compensation value for the second rotary flat lens 32 in the first direction is required. The compensation value may be implemented by the first rotary flat lens 31 by rotating around the first direction. A specific angle may be determined based on the compensation value, a thickness and a refractive index of the first rotary flat lens 31, and an offset caused by a unit angle.

For example, assuming that the lens module implements optical image stabilization by using only one rotary flat lens (that is, the first rotary flat lens 31), an image offset that is in the first direction and that is caused by rotation of the first rotary flat lens 31 around the first direction by a unit angle (for example, 1°) may be determined in advance based on the thickness, the refractive index, and the like of the first rotary flat lens 31. Then the angle by which the first rotary flat lens 31 needs to rotate around the first direction, that is, the first rotation angle, is further determined based on the compensation value.

For another example, assuming that the lens module may implement optical image stabilization by using a group of rotary flat lenses including the first rotary flat lens 31, the compensation value may be shared by deflection angles of a plurality of (for example, n, where n>1, and n is an integer) rotary flat lenses included in the group of rotary flat lenses. Assuming that a rotation angle, corresponding to the compensation value, of a flat lens is α, and a rotation angle of an $i^{th}$ (i is a value obtained by traversing [1, i]) flat lens of the n flat lenses is $α_i$, a rotation angle of each of the n flat lenses needs to satisfy $$\sin α = \sum_{i=1}^{n} \sin α_i.$$

For example, if n=2 and α=15°, $α_1=α_2=7.44°$. It should be understood that the foregoing examples are merely shown for ease of understanding, and shall not constitute any limitation on this application. For example, rotation angles of the flat lenses may be the same or different. This is not limited in this application. It should be further understood that the foregoing n flat lenses may be alternatively some lenses in the group of rotary flat lenses. In other words, optical image stabilization in the first direction can be implemented through rotation of at least some flat lenses in the group of rotary lenses.

It should be understood that, for ease of understanding, the foregoing shows a specific implementation of determining the first rotation angle; however, this shall not constitute any limitation on this application. An implementation of determining the first rotation angle may be determined by using a general optical image stabilization algorithm in the prior art.

It should be noted that the foregoing functions of the optical image stabilization algorithm library may be performed by hardware, for example, may be performed by hardware configured to implement corresponding functions, or may be performed by driver software. This is not limited in this application. It should be further understood that, for the optical image stabilization algorithm, reference may be made to the prior art.

It should be further noted that the foregoing first control module 25 and second control module 35 may be implemented by same hardware, for example, functions corresponding to the first control module 25 and the second control module 35 may be implemented by a same motor; or may be implemented by different hardware, for example, functions corresponding to the first control module 25 and the second control module 35 may be separately implemented by different motors. This is not limited in this application.

It should be further understood that, in the figure, merely for ease of understanding, a process of implementing optical image stabilization by the first rotary flat lens 31 is described in detail by using an example in which the X-axis direction is the first direction. The first direction is not limited in this application. The first direction may be any direction of a plane perpendicular to the optical axis direction. For example, the first direction may be the Y-axis direction shown in the figure.

Therefore, in this embodiment of this application, the first rotary flat lens 31 is controlled to rotate around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

Figure 8:
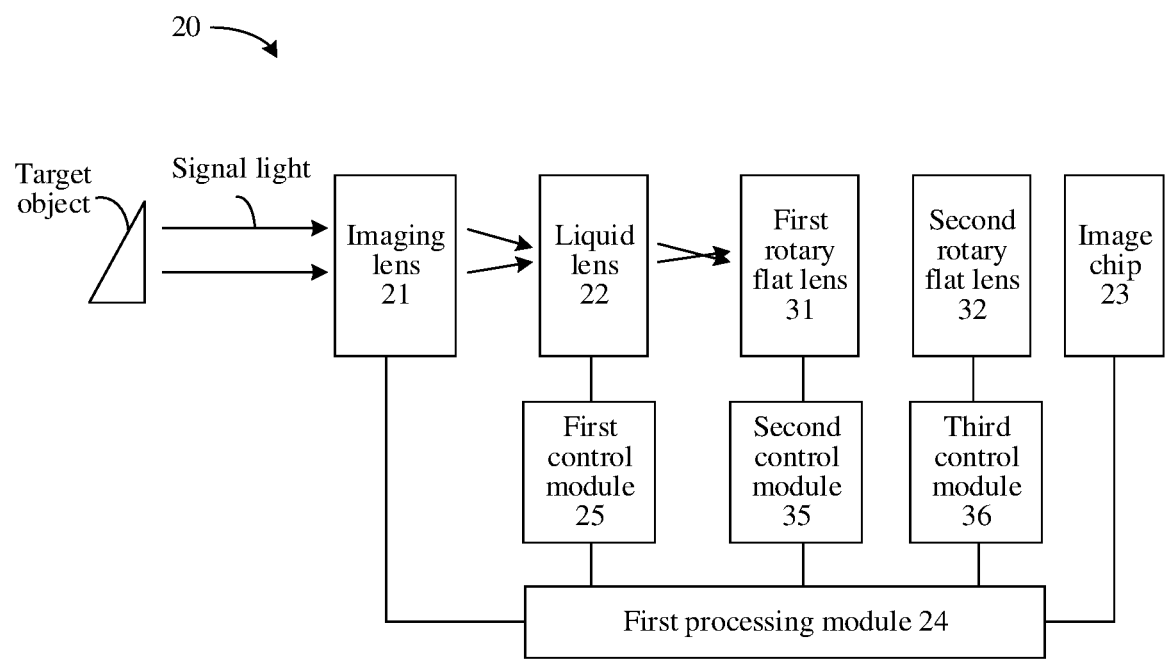
FIG. 8 is a schematic diagram 3 of a lens module according to an embodiment of this application.

FIG. 8 is a schematic diagram 3 of a lens module 20 according to an embodiment of this application. Optionally, as shown in FIG. 8, the lens module 20 further includes a transparent second rotary flat lens 32 and a third control module 36.

The second rotary flat lens 32 may be located between the imaging lens 21 and the image chip 23, and is configured to transmit the imaging beam refracted by the liquid lens 22 or the imaging beam not refracted by the liquid lens 22. In other words, the second rotary flat lens 32 may be located between the liquid lens 22 and the image chip 23, or may be located between the imaging lens 21 and the liquid lens 22. The second rotary flat lens 32 may be located in front of or behind the first rotary flat lens 31. For example, both the first rotary flat lens 31 and the second rotary flat lens 32 may be located between the liquid lens 22 and the image chip 23, and the first rotary flat lens 31 may be located in front of or behind the second rotary flat lens 32. Alternatively, both the first rotary flat lens 31 and the second rotary flat lens 32 may be located between the imaging lens 21 and the liquid lens 22, and the first rotary flat lens 31 may be located in front of or behind the second rotary flat lens 32. Alternatively, the first rotary flat lens 31 may be located between the imaging lens 21 and the liquid lens 22, and the second rotary flat lens 32 may be located between the liquid lens 22 and the image chip 23. Alternatively, the second rotary flat lens 32 may be located between the imaging lens 21 and the liquid lens 22, and the first rotary flat lens 31 may be located between the liquid lens 22 and the image chip 23. It should be understood that a front/back location relationship between the first rotary flat lens 31, the second rotary flat lens 32, and the liquid lens 22 is not particularly limited in this application.

In this embodiment of this application, the second rotary flat lens 32 may rotate around a second direction. Herein, the second direction is perpendicular to the first direction, and the second direction is perpendicular to the optical axis of the imaging lens.

It should be understood that the second rotary flat lens 32 may be a flat lens that is configured between the imaging lens 21 and the image chip 23 and that can rotate around the second direction, or may be any one of a group of parallel flat lenses that are configured between the imaging lens 21 and the image chip 23 and that can rotate around the second direction. A specific quantity of flat lenses that can rotate around the second direction is not limited in this application.

Vibration of the lens module 20 may be caused by rotation around the first direction and rotation around the second direction. Therefore, in addition to the angle by which the lens module 20 rotates around the first direction, the first processing module 24 may be further configured to detect an angle by which the lens module 20 rotates around the second direction. For example, the gyroscope configured in the imaging lens may be configured to detect whether the imaging lens 21 deflects around the second direction, and when detecting that the imaging lens 21 deflects around the second direction, notify the first processing module 24 of a detected deflection angle.

The first processing module 24 may be communicatively connected to the third control module 36, and the third control module 36 may be communicatively connected to the second rotary flat lens 32.

The first processing module 24 may be further configured to determine, based on the angle by which the lens module 20 rotates around the second direction, an angle by which the second rotary flat lens 32 needs to be adjusted. In addition, the third control module 36 adjusts the second rotary flat lens 32 to rotate around the second direction, so as to compensate for vibration caused by the angle by which the lens module 20 rotates around the second direction. The second control module 36 may be configured to adjust an angle by which the second rotary flat lens 32 rotates around the second direction, so as to adjust an angle by which the imaging beam refracted by the liquid lens 22 or the imaging beam not refracted by the liquid lens 22 is refracted when passing through the second rotary flat lens 32.

For ease of differentiation and description, the angle by which the second rotary flat lens 32 needs to be adjusted may be denoted as a first rotation angle. For example, the second rotation angle may be a relative variation relative to an angle of the second rotary flat lens 32 at a previous detection moment, or an angle by which adjustment is performed relative to a location of the second rotary flat lens 32 at a previous detection moment. The first processing module 24 may determine an output current or an output voltage of the third control module 36 based on the angle by which adjustment needs to be performed.

It should be understood that a specific process of determining, by the first processing module 24, the output current or the output voltage of the third control module 36 based on the angle by which adjustment needs to be performed may be the same as the foregoing specific process of determining the output current or the output voltage of the second control module 35.

Figure 9:
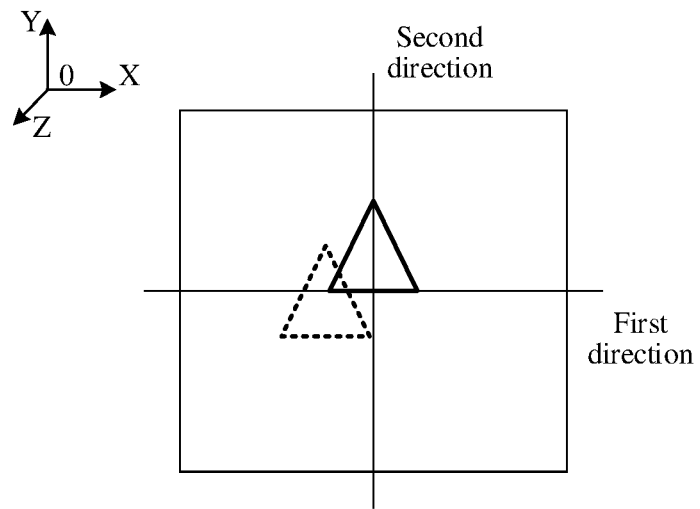
FIG. 9 is another schematic diagram of implementing optical image stabilization by a lens module according to an embodiment of this application.

FIG. 9 is another schematic diagram of implementing optical image stabilization by using a lens module according to an embodiment of this application. It should be noted that in the schematic diagram shown in FIG. 9, an X-axis direction may be the first direction, a Y-axis direction may be the second direction, and a Z-axis direction may be the optical axis direction. The X-axis, the Y-axis, and the Z-axis are perpendicular to each other.

FIG. 9 shows a location at which an imaging beam is converged to the image chip when the lens module does not vibrate and a location at which an imaging beam is converged to the image chip when vibration is caused by both rotation around the first direction and rotation around the second direction. It is assumed that a target object is a triangle. A solid-line triangle in the figure is a schematic diagram of a location at which the target object is converged to the image chip through the imaging lens 21 when the lens module 20 does not vibrate. A dashed-line triangle in the figure is a schematic diagram of a location at which the target object is converged to the image chip through the imaging lens 21 when the lens module 20 rotates around both the first direction and the second direction. The location at which the imaging beam is converged to the image chip 23 is shifted in the second direction due to the rotation of the lens module 20 around the first direction, and the location at which the imaging beam is converged to the image chip 23 is shifted in the first direction due to the rotation of the lens module 20 around the second direction. As a result, definition of a digital image obtained through conversion may be finally low.

It should be understood that FIG. 9 is merely a schematic diagram for ease of understanding of a location at which an imaging beam is converged to the image chip when the lens module vibrates and a location at which an imaging beam is converged to the image chip when the lens module does not vibrate. However, this does not mean that the lens module generates a plurality of optical images within an exposure time of one frame of image.

In this embodiment of this application, the first processing module 24 determines, based on the rotation angle of the lens module 20 around the first direction and the rotation angle of the lens module 20 around the second direction, a compensation value corresponding to the rotation angle around the first direction and a compensation value corresponding to the rotation angle around the second direction, respectively; determines the output current or the output voltage of the second control module 35 based on the compensation value corresponding to the rotation angle around the first direction; and determines the output current or the output voltage of the third control module 36 based on the compensation value corresponding to the rotation angle around the second direction.

It should be understood that a specific process of determining, by the first processing module 24, a corresponding compensation value based on the rotation angle around the second direction, and determining the output current or the output voltage of the third control module 36 based on the compensation value is the same as the specific process of determining, by the first processing module 24, a corresponding compensation value based on the rotation angle around the first direction, and determining the output current or the output voltage of the second control module based on the compensation value.

In addition, the vibration caused by the rotation around the second direction may be compensated for by rotation of a flat lens (that is, the second rotary flat lens) around the second direction, or may be compensated for by rotation of a group of parallel rotary flat lenses including the second rotary flat lens around the second direction. When a group of rotary flat lenses rotate for compensation, an angle by which each flat lens needs to rotate around the second direction may satisfy $$\sin\beta = \sum_{j=1}^{m} \sin\beta_j,$$

where β is a rotation angle determined for a flat lens based on the compensation value corresponding to the rotation angle around the second direction, m (m>1, and m is an integer) is a quantity of rotary flat lenses in the group of rotary lenses, and $\beta_j$ is an angle by which a $j^{th}$ (j is a value obtained by traversing [1, m]) flat lens of the m flat lenses rotates. The foregoing m flat lenses may be all or some of the group of rotary lenses.

It should be noted that the third control module and the foregoing first control module and second control module may be implemented by same hardware, for example, functions corresponding to the first control module, the second control module, and the third control module may be implemented by a same motor; or may be implemented by different hardware, for example, functions corresponding to the first control module, the second control module, and the third control module may be separately implemented by different motors, or functions corresponding to the first control module may be implemented by one motor, and functions corresponding to the second control module and the third control module may be implemented by another motor. This is not limited in this application.

It should be further understood that, in the figure, merely for ease of understanding, an example in which the X-axis direction is the first direction and the Y-axis direction is the second direction is used for detailed description. Specific directions of the first direction and the second direction are not limited in this application. The first direction may be any direction of a plane perpendicular to the optical axis direction, and the second direction may be determined based on the first direction and the optical axis direction. For example, the first direction may be the Y-axis direction shown in the figure, and the second direction may be the X-axis direction shown in the figure.

Therefore, in this embodiment of this application, the first rotary flat lens 31 rotates around the first direction to compensate for the rotation of the lens module around the first direction, and the second rotary flat lens rotates around the second direction to compensate for the rotation of the lens module around the second direction, so that possible drifts of an image point location in different directions in an exposure process can be avoided, and image stabilization can be maintained, thereby achieving an optical image stabilization effect and further ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

It should be understood that the foregoing describes in detail the lens module provided in this embodiment of this application with reference to the accompanying drawings, and an optical path diagram in the figures is merely for ease of understanding and shall not constitute any limitation on this application.

Optionally, the first processing module 24 is further configured to detect the angle by which the lens module 20 rotates around the first direction and/or the angle by which the lens module 20 rotates around the second direction, and is configured to adjust the distance between the first flat lens and the second flat lens by using the first control module 25 and based on the angle by which the lens module 20 rotates around the first direction and/or the angle by which the lens module 20 rotates around the second direction, so as to adjust the definition of the image generated by the image chip.

In a rotation process of the lens module 20 and a rotary lens (including the first rotary flat lens 31 or the second rotary flat lens 32), signal light that is originally incident in parallel to the optical axis becomes non-parallel to the optical axis due to rotation of the rotary lens, the signal light deflects due to the rotation of the rotary lens, and an effective optical path of the signal light changes. This may cause a change of an image distance. Consequently, a slight drift may occur on an optimal imaging plane, causing deviation from a location of the image chip 23. As a result, definition of an optical image received on the image chip 23 is low. In this case, if the rotary lens group simply rotates to implement optical image stabilization, quality of the generated image may not be optimal. However, if the thickness of the liquid lens 22 is adaptively adjusted with reference to vibration of the lens module 20, that is, an image distance is adjusted by changing an effective optical path, so that an optimal imaging plane is still kept at the location of the image chip 23, a clear image can be generated on the image chip 23 by using an imaging beam.

In the lens module 20, the first processing module 24 may be connected to the imaging lens 21 equipped with the gyroscope, and the first processing module 24 may determine, based on the rotation angle that is detected by the gyroscope and by which the lens module 20 rotates around the first direction and/or the rotation angle that is detected by the gyroscope and by which the lens module 20 rotates around the second direction, a value by which the liquid lens 22 needs to be adjusted relative to a thickness before the lens module 20 rotates. Herein, for ease of differentiation, a variation by which the thickness of the liquid lens 22 is adjusted in the optical image stabilization stage may be denoted as a second relative displacement. The first processing module 24 may send the rotation angle of the lens module 20 around the first direction and/or the rotation angle of the lens module 20 around the second direction to the optical image stabilization algorithm library. The optical image stabilization algorithm library may calculate a value by which the distance between the first flat lens and the second flat lens in the liquid lens 22 needs to be adjusted, based on the rotation angle of the lens module 20 around the first direction and/or the rotation angle of the lens module 20 around the second direction, a focal length of the imaging lens 21, and a thickness of each flat lens (for example, one or more flat lenses including the first flat lens 221, the second flat lens 222, the first rotary flat lens 31, and the second rotary flat lens 32) in the lens module 20.

An optical image shown in FIG. 6 is used as an example. When vibration is caused by rotation of the lens module 20 around the first direction, that is, the image is shifted in the second direction, in addition to controlling the second rotary flat lens 32 to rotate around the first direction to compensate for the vibration, the thickness of the liquid lens may be further adjusted, for example, a relative distance between the first flat lens and the second flat lens is decreased, to reduce an effective optical path of signal light between the imaging lens and the image chip, so that an imaging beam can exactly generate a clear image on the image chip. The second relative displacement value by which the liquid lens is adjusted may be determined by using the foregoing optical image stabilization algorithm. In this embodiment, the second relative displacement value may be determined based on a light propagation formula and based on the rotation angle of the lens module, the focal length of the imaging lens, and a thickness of each of the foregoing flat lenses.

In a specific implementation process, the first control module may control one or two of the first flat lens and the second flat lens in the liquid lens to move. For example, in the auto-focus stage, the first control module may control the first flat lens to move along the optical axis direction, and in the optical image stabilization stage, the first control module may control the second flat lens to move along the optical axis direction. However, it should be understood that the specific implementation process herein is merely a possible implementation, and shall not constitute any limitation on this application.

It should be further understood that the foregoing functions of the optical image stabilization algorithm may be separately performed on hardware, for example, an image processing apparatus configured in the lens module, or an image processing system in a camera or a terminal device equipped with the lens module; or the functions of the optical image stabilization algorithm library may be performed by driver software. This is not limited in this application. It should be further understood that, for the optical image stabilization algorithm, reference may be made to the prior art.

Optionally, the first processing module 24 may be further configured to perform image processing on the digital image obtained by the image chip 23 through conversion. As a non-limiting example, the image processing may include noise reduction processing, enhancement processing, and/or blurring processing.

It should be further understood that, for a specific manner of image processing, reference may be made to the prior art.

It should be further understood that the image processing function may be implemented by hardware used for image processing, for example, a processor configured in the lens module, where the processor may be an image processing system configured in a camera or a terminal device; or the image processing function may be performed by driver software. This is not limited in this application.

It should be further understood that, in the foregoing lens module shown in FIG. 2 and FIG. 9, corresponding functions of the first processing module may be implemented by a processor configured in the lens module (for example, the processor may be an image processing system configured in a camera or a terminal device); or different functions may be implemented by a plurality of processing units configured in the lens module. A specific form or quantity of first processing modules is not particularly limited in this application.

The foregoing describes in detail the lens module provided in an embodiment of this application with reference to FIG. 2 to FIG. 9. The following describes in detail a lens module provided in another embodiment of this application with reference to FIG. 10 to FIG. 12.

Figure 10:
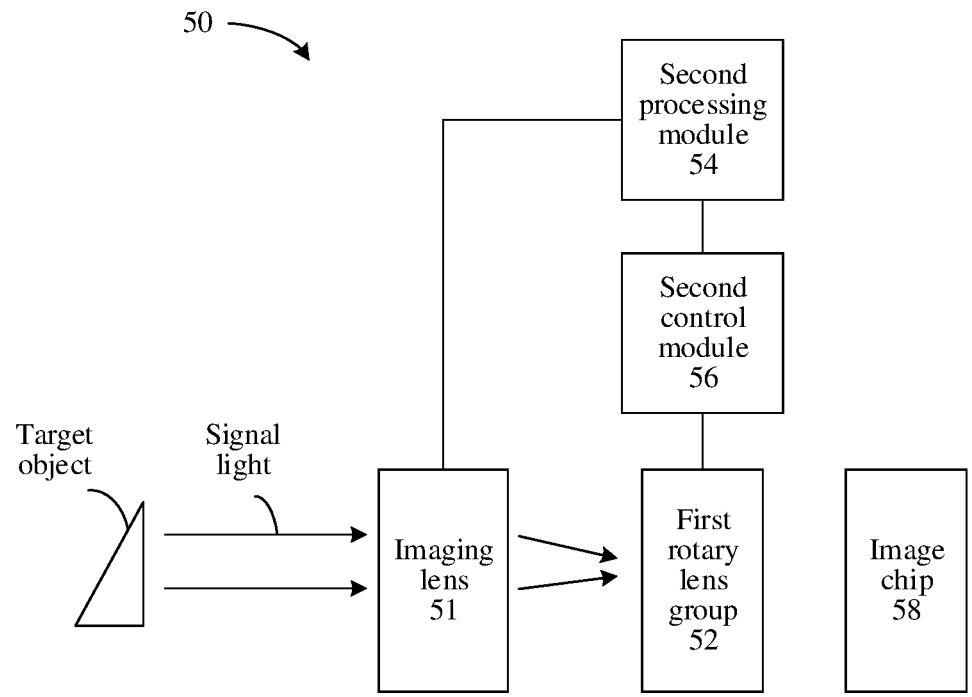
FIG. 10 is a schematic diagram 1 of a lens module according to another embodiment of this application.

FIG. 10 is a schematic diagram 1 of a lens module 50 according to another embodiment of this application. As shown in FIG. 10, the lens module 50 includes an imaging lens 51, a transparent first rotary lens group 52, a second processing module 54, a second control module 56, and an image chip 58.

The first rotary lens group 52 may be located between the imaging lens 51 and the image chip 58. That is, the first rotary lens group 52 may be located in a range of a mechanical back focal length of the lens module 50. The first rotary lens group 52 may be configured to transmit an imaging beam that comes from the imaging lens 51, and emit the imaging beam that passes through the first rotary lens group 52 to the image chip 58. The image chip 58 may be configured to generate a digital image based on the imaging beam that passes through the first rotary lens group 52.

In this embodiment of this application, the first rotary lens group 52 may rotate around a first direction. Herein, the first direction is perpendicular to an optical axis of the imaging lens.

It should be understood that the first rotary lens group 52 may be a flat lens that is configured between the imaging lens 51 and the image chip 58 and that can rotate around the first direction, or may be any one of a group of parallel flat lenses that are configured between the imaging lens 51 and the image chip 58 and that can rotate around the first direction. A specific quantity of flat lenses that can rotate around the first direction is not limited in this application.

Vibration of the lens module 50 may be caused by rotation of the lens module 50 around the first direction. The second processing module 54 may be further configured to detect an angle by which the lens module 50 rotates around the first direction. A specific method for detecting, by the second processing module 54, the angle by which the lens module 50 rotates around the first direction is described in detail above.

In this embodiment of this application, the second control module 56 may be communicatively connected to the second processing module 54, and the second control module 56 may be communicatively connected to the first rotary lens group 52. The second processing module 54 may adjust, by using the second control module 56 and based on the detected angle by which the lens module 50 rotates around the first direction, an angle by which the first rotary lens group 52 rotates around the first direction, to adjust an angle by which the imaging beam that comes from the imaging lens deflects when passing through the first rotary lens group 52, so as to compensate for vibration caused by the angle by which the lens module 50 rotates around the first direction.

It should be understood that a specific process in which the first processing module 54 adjusts, by using the second control module 56 and based on the angle by which the lens module 50 rotates around the first direction, the first rotary lens group 52 to rotate around the first direction to implement optical image stabilization is the same as the foregoing specific process in which the first processing module 24 adjusts, by using the second control module 35 and based on the angle by which the lens module 20 rotates around the first direction, the first rotary flat lens 31 to rotate around the first direction to implement optical image stabilization. The process is described in detail above with reference to FIG. 5 to FIG. 7.

Therefore, in this embodiment of this application, the first rotary flat lens is controlled to rotate around the first direction to compensate for rotation of the lens module around the first direction, so that a possible drift of an image point location in an exposure process can be avoided, and image stabilization can be maintained, thereby achieving an optical image stabilization effect and ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

Figure 11:
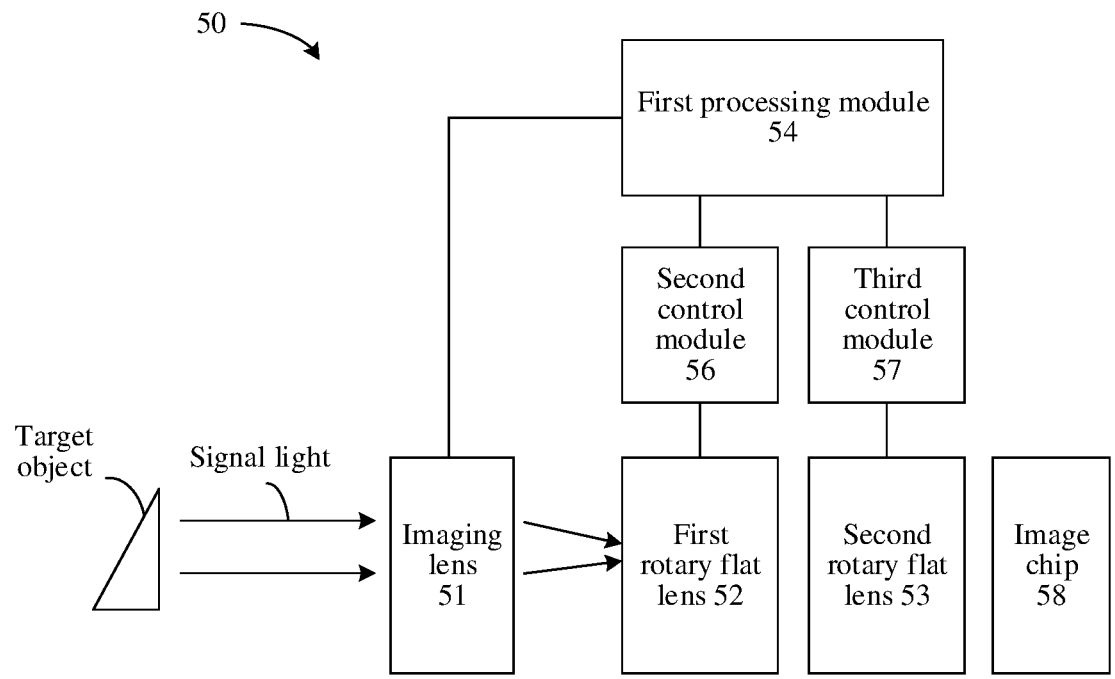
FIG. 11 is a schematic diagram 2 of a lens module according to another embodiment of this application.

FIG. 11 is a schematic diagram 2 of a lens module 50 according to another embodiment of this application. As shown in FIG. 11, the lens module 50 further includes a transparent second rotary flat lens 53 and a third control module 57.

The transparent second rotary flat lens 53 may be located between the imaging lens 51 and the image chip 58, and is configured to transmit the imaging beam emitted from the first rotary flat lens 52 or the imaging beam that comes from the imaging lens. In other words, the second rotary flat lens 53 may be located between the imaging lens 51 and the first rotary flat lens 52, or may be located between the first rotary flat lens 52 and the image chip 58. When the second rotary flat lens 53 is located between the imaging lens 51 and the first rotary flat lens 52, an imaging beam emitted to the second rotary flat lens 53 comes from the imaging lens 51. When the second rotary flat lens 53 is located between the first rotary flat lens 52 and the image chip 58, an imaging beam emitted to the second rotary flat lens 53 is the imaging beam emitted from the first rotary flat lens 52. In other words, the second rotary flat lens 53 may be located in front of or behind the first rotary flat lens 52. A front/back location relationship between the first rotary flat lens 52 and the second rotary flat lens 53 is not particularly limited in this application.

In this embodiment of this application, the second rotary flat lens 53 may rotate around a second direction. Herein, the second direction may be perpendicular to the first direction, and the second direction may be perpendicular to the optical axis of the imaging lens.

It should be understood that the second rotary flat lens 53 may be a flat lens that is configured between the imaging lens 51 and the image chip 58 and that can rotate around the second direction, or may be any one of a group of parallel flat lenses that are configured between the imaging lens 51 and the image chip 58 and that can rotate around the second direction. A specific quantity of flat lenses that can rotate around the second direction is not limited in this application.

Vibration of the lens module 50 may be caused by rotation around the first direction and rotation around the second direction. Therefore, in addition to the angle by which the lens module 50 rotates around the first direction, the first processing module 54 may be further configured to detect an angle by which the lens module 50 rotates around the second direction. A specific method for detecting, by the first processing module 54, the angle by which the lens module 50 rotates around the second direction is described in detail above.

In this embodiment of this application, both the second control module 56 and the third control module 57 may be communicatively connected to the first processing module 54, the second control module 56 may be communicatively connected to the first rotary flat lens 52, and the third control module 57 may be communicatively connected to the second rotary flat lens 53. The first processing module 54 may adjust, by using the second control module 56 and based on the detected angle by which the lens module 50 rotates around the first direction, the angle by which the first rotary flat lens 52 rotates around the first direction, to adjust an angle by which the imaging beam that comes from the imaging lens deflects when passing through the first rotary flat lens 52, so as to compensate for vibration caused by the angle by which the lens module 50 rotates around the first direction. In addition, the first processing module 54 may adjust, by using the third control module 57 and based on the detected angle by which the lens module 50 rotates around the second direction, an angle by which the second rotary flat lens 53 rotates around the second direction, to adjust an angle by which the imaging beam that comes from the imaging lens or the imaging beam that passes through the first rotary flat lens 52 deflects when passing through the first rotary flat lens 52, so as to compensate for vibration caused by the angle by which the lens module 50 rotates around the second direction.

It should be understood that a specific process in which the first processing module 54 adjusts, by using the third control module 57 and based on the angle by which the lens module 50 rotates around the second direction, the second rotary flat lens 53 to rotate around the second direction to implement optical image stabilization is the same as the foregoing specific process in which the first processing module 24 adjusts, by using the second control module 35 and based on the angle by which the lens module 20 rotates around the first direction, the first rotary flat lens 31 to rotate around the first direction to implement optical image stabilization. The process is described in detail above with reference to FIG. 5 to FIG. 7.

Therefore, in this embodiment of this application, the first rotary flat lens rotates around the first direction to compensate for the rotation of the lens module around the first direction, and the second rotary flat lens rotates around the second direction to compensate for the rotation of the lens module around the second direction, so that possible drifts of an image point location in different directions in an exposure process can be avoided, and image stabilization can be maintained, thereby achieving an optical image stabilization effect and further ensuring image definition. Compared with the prior art, the entire imaging lens no longer needs to be pushed to implement optical image stabilization. Therefore, the lens module is not limited by the imaging lens with a complex structure or a comparatively heavy weight, and can be more widely applied to a camera configured in a terminal device.

Figures 12, 13:
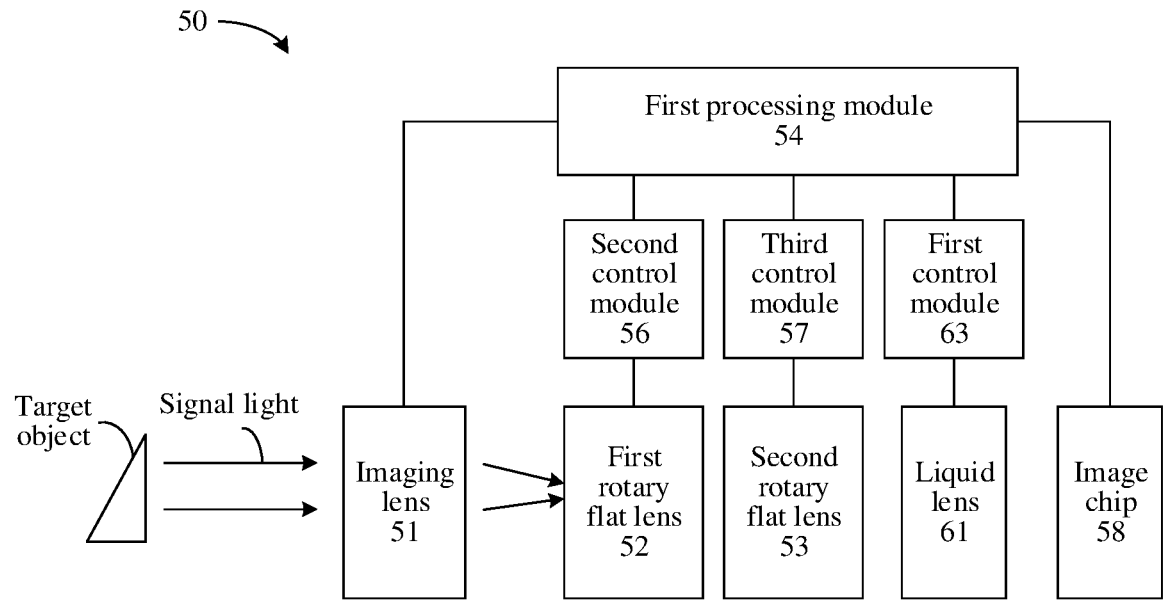
FIG. 12 is a schematic diagram 3 of a lens module according to another embodiment of this application.
FIG. 13 is a schematic flowchart of a lens module control method according to an embodiment of this application.

FIG. 12 is a schematic diagram 3 of a lens module 50 according to another embodiment of this application. Optionally, as shown in FIG. 12, the lens module 50 further includes a liquid lens 61 and a first control module 63.

The liquid lens 61 may be located between the imaging lens 51 and the image chip 58, and may be configured to refract the imaging beam that comes from the imaging lens 21 or refract the imaging beam emitted from the first rotary flat lens 52, and emit a refracted imaging beam to the image chip 58. In other words, the liquid lens 61 may be located behind the imaging lens 51, and refract the imaging beam that comes from the imaging lens 51 and then emit a refracted imaging beam to the first rotary flat lens 52 or the second rotary flat lens 53; or the liquid lens 61 may be located in front of the image chip 58, and refract an imaging beam emitted from the first rotary flat lens 52 or the second rotary flat lens 53 and then emit a refracted imaging beam to the image chip 58. When the lens module 50 includes the first rotary flat lens 52 and the second rotary flat lens 53, the liquid lens 61 may be alternatively located between the first rotary flat lens 52 and the second rotary flat lens 53, and refract an imaging beam emitted from the first rotary flat lens 52 and then emit a refracted imaging beam to the second rotary flat lens 53, or refract an imaging beam emitted from the second rotary flat lens 53 and then emit a refracted imaging beam to the first rotary flat lens 52. A front/back location relationship between the first rotary flat lens 52, the second rotary flat lens 53, and the liquid lens 61 is not particularly limited in this application. Any front/back location relationship shall fall within the protection scope of this application, provided that the first rotary flat lens 52, the second rotary flat lens 53, and the liquid lens 61 are located within the mechanical back focal length of the lens module.

In this embodiment of this application, the liquid lens 61 may include a transparent first flat lens and a transparent second flat lens that are parallel to each other, and a transparent liquid object is filled between the first flat lens and the second flat lens. The first flat lens and the second flat lens are perpendicular to the optical axis of the imaging lens. The imaging beam that comes from the imaging lens, the imaging beam emitted from the first rotary flat lens, or the imaging beam emitted from the second rotary flat lens may be emitted from the first flat lens to the liquid lens. An imaging beam refracted by the liquid lens is emitted from the second flat lens. Refractive indexes of the first flat lens, the second flat lens, and the liquid object are greater than 1.

The image chip 58 may be communicatively connected to the first processing module 54, the first processing module 54 may be communicatively connected to the first control module 63, and the first control module 63 may be connected to the liquid lens 61. The image chip 58 may generate a digital image based on a received imaging beam, and send the digital image to the first processing module 54. The first processing module 54 may determine, based on definition of the digital image, whether a thickness of the liquid lens needs to be adjusted; and when the thickness needs to be adjusted, adjust a distance between the first flat lens and the second flat lens by using the first control module 63, so as to adjust the definition of the image generated by the image chip 58.

It should be understood that the foregoing describes in detail the liquid lens and a specific method for implementing auto-focus by using the liquid lens with reference to FIG. 2 to FIG. 4. In this embodiment of this application, a specific method for implementing auto-focus by using the liquid lens is the same as the foregoing specific method.

Therefore, in this embodiment of this application, by adjusting the thickness of the liquid object in the liquid lens, the lens module can adjust the thickness of the liquid lens for photographed objects at different distances from the imaging lens, so that when a physical distance between the imaging lens and the image chip is fixed, an effective optical path of signal light may change with the thickness of the liquid lens to match image distances corresponding to different object distances, so as to obtain a clear image and achieve an auto-focus effect. Compared with the prior art, the entire imaging lens no longer needs to be pushed to implement auto-focus. Therefore, the lens module is not limited by the imaging lens with a complex structure or a comparatively heavy weight, and can be more widely applied to a camera configured in a terminal device. In addition, because the liquid lens provided in this application is a flat lens, an aperture size of a lens is not affected, and the liquid lens is applicable to a lens module with any optical aperture.

It should be further understood that the foregoing first processing module, second processing module, and third processing module may be a same processing module, for example, corresponding functions of the processing module may be implemented by a processor configured in the lens module; or may be modules independent of each other. This is not limited in this application. The first control module, the second control module, and the third control module may be a same control module. For example, corresponding functions of the control module may be implemented by a drive motor configured in the lens module. A specific form or quantity of modules is not particularly limited in this application.

Optionally, the first processing module 54 is further configured to detect the angle by which the lens module 50 rotates around the first direction and/or the angle by which the lens module 50 rotates around the second direction, and is configured to adjust the distance between the first flat lens and the second flat lens by using the first control module 63 and based on the angle by which the lens module 50 rotates around the first direction and/or the angle by which the lens module 50 rotates around the second direction, so as to adjust the definition of the image generated by the image chip.

In a rotation process of the lens module 20 and a rotary lens (including the first rotary flat lens 31 or the second rotary flat lens 32), signal light that is originally incident in parallel to the optical axis becomes non-parallel to the optical axis due to rotation of the rotary lens, the signal light deflects due to the rotation of the rotary lens, and an effective optical path of the signal light changes. This may cause a change of an image distance. Consequently, a slight drift may occur on an optimal imaging plane, causing deviation from a location of the image chip 23. As a result, definition of an optical image received on the image chip 23 is low. In this case, if the rotary lens group simply rotates to implement optical image stabilization, quality of the generated image may not be optimal. However, if the thickness of the liquid lens 22 is adaptively adjusted with reference to vibration of the lens module 20, that is, an image distance is adjusted by changing an effective optical path, so that an optimal imaging plane is still kept at the location of the image chip 23, a clear image can be generated on the image chip 23 by using an imaging beam.

It should be understood that the foregoing describes in detail a specific method for adjusting the thickness of the liquid lens in the optical image stabilization process to improve image quality. In this embodiment, a specific method for adjusting the thickness of the liquid lens may be the same as the foregoing specific method.

Optionally, the first processing module 54 may be further configured to perform image processing on the digital image obtained by the image chip 58 through conversion. As an example instead of a limitation, the image processing may include noise reduction processing, enhancement processing, and/or blurring processing.

It should be further understood that, for a specific manner of image processing, reference may be made to the prior art.

It should be further understood that the image processing function may be implemented by hardware used for image processing, for example, a processor configured in the lens module, where the processor may be an image processing system configured in a camera or a terminal device; or the image processing function may be performed by driver software. This is not limited in this application.

It should be further understood that the foregoing first control module, second control module, and third control module may be implemented by same hardware, for example, functions corresponding to the first control module, the second control module, and the third control module may be implemented by a same motor; or may be implemented by different hardware, for example, functions corresponding to the first control module, the second control module, and the third control module may be separately implemented by different motors, or functions corresponding to the first control module may be implemented by one motor, and functions corresponding to the second control module and the third control module may be implemented by another motor. This is not limited in this application.

It should be further understood that the foregoing describes in detail the lens module provided in the embodiments of this application with reference to FIG. 2 to FIG. 12. The figures show schematic relative locations of components (for example, including the liquid lens, the first rotary flat lens, and the second rotary flat lens) in the imaging lens and the image chip merely for ease of understanding. However, this shall not constitute any limitation on this application. A front/back location relationship between the liquid lens and the first rotary flat lens, and a front/back location relationship between the liquid lens, the first rotary flat lens, and the second rotary flat lens are not limited in this application.

The foregoing describes in detail the lens module provided in another embodiment of this application with reference to FIG. 10 to FIG. 12.

This application further provides a terminal device. The terminal device is equipped with the foregoing lens module.

Optionally, a gyroscope is configured in the terminal device, and the gyroscope may be configured to detect a rotation angle and a rotation direction of an imaging lens, so that the second processing module and the third processing module determine a first rotation angle and a second rotation angle based on the detected rotation angle.

Optionally, an image processing system is configured in the terminal device, and the image processing system includes an image processor and an image chip. The image processor may be configured to implement functions of the first processing module.

This application further provides a lens module control method. The following describes in detail the lens module control method provided in the embodiments of this application with reference to the accompanying drawings.

FIG. 13 is a schematic flowchart of a lens module control method 1000 according to an embodiment of this application. The method 1000 may be applied to the foregoing lens module 20. The lens module 20 includes an imaging lens, a liquid lens, an image chip, a first processing module, and a first control module. The liquid lens is located between the imaging lens and the image chip, and is configured to refract an imaging beam that comes from the imaging lens, and emit a refracted imaging beam to the image chip. The liquid lens includes a transparent first flat lens and a transparent second flat lens that are parallel to each other. A transparent liquid object is filled between the first flat lens and the second flat lens. The first flat lens and the second flat lens are perpendicular to an optical axis of the imaging lens. The imaging beam that comes from the imaging lens is emitted from the first flat lens to the liquid lens, and the imaging beam refracted by the liquid lens is emitted from the second flat lens. Refractive indexes of the first flat lens, the second flat lens, and the liquid object are greater than 1.

As shown in FIG. 13, the control method 1000 may include the following steps:

Step 1100: The image chip generates a digital image based on the imaging beam refracted by the liquid lens.

Step 1200: The first processing module adjusts a distance between the first flat lens and the second flat lens by using the first control module and based on definition of the digital image, so as to adjust the definition of the image generated by the image chip.

Optionally, the lens module further includes a transparent first rotary flat lens and a second control module. The first rotary flat lens is located between the imaging lens and the image chip, and is configured to transmit the imaging beam refracted by the liquid lens or the imaging beam not refracted by the liquid lens.

The method 1000 further includes:

detecting, by the first processing module, an angle by which the lens module rotates around a first direction; and adjusting, by the first processing module by using the second control module and based on the angle by which the lens module rotates around the first direction, an angle by which the first rotary flat lens rotates around the first direction, to adjust an angle by which the imaging beam refracted by the liquid lens or the imaging beam not refracted by the liquid lens deflects when passing through the first rotary flat lens, so as to compensate for vibration caused by the angle by which the lens module rotates around the first direction, where the first direction is perpendicular to the optical axis of the imaging lens.

Optionally, the lens module further includes a second rotary flat lens and a third control module. The second rotary flat lens is located between the imaging lens and the image chip, and is configured to transmit the imaging beam refracted by the liquid lens or the imaging beam not refracted by the liquid lens.

The method 1000 further includes:

detecting, by the first processing module, an angle by which the lens module rotates around a second direction; and adjusting, by the first processing module by using the third control module and based on the angle by which the lens module rotates around the second direction, an angle by which the second rotary flat lens rotates around the second direction, to adjust an angle by which the imaging beam refracted by the liquid lens or the imaging beam not refracted by the liquid lens deflects when passing through the second rotary flat lens, so as to compensate for vibration caused by the angle by which the lens module rotates around the second direction, where the second direction is perpendicular to the optical axis of the imaging lens, and the second direction is perpendicular to the first direction.

Optionally, the method 1000 further includes:

detecting, by the first processing module, the angle by which the lens module rotates around the first direction and/or the angle by which the lens module rotates around the second direction; and adjusting, by the first processing module, the distance between the first flat lens and the second flat lens by using the first control module and based on the angle by which the lens module rotates around the first direction and/or the angle by which the lens module rotates around the second direction, so as to adjust the definition of the image generated by the image chip.

Optionally, the method 1000 further includes:

performing, by the first processing module, image processing on the digital image, where the image processing includes at least noise reduction processing, enhancement processing, and blurring processing.

It should be understood that the foregoing describes in detail specific functions of the modules or units and steps performed by the modules or units with reference to FIG. 2 to FIG. 9.

FIG. 14 is a schematic flowchart of a lens module control method 2000 according to another embodiment of this application. The method 2000 may be applied to the foregoing lens module 50. The lens module 50 includes an imaging lens, a transparent first rotary flat lens, an image chip, and a second control module. The first rotary flat lens is located between the imaging lens and the image chip, and is configured to transmit an imaging beam that comes from the imaging lens, emit the imaging beam that passes through the first rotary flat lens to the image chip, refract the imaging beam, and emit a refracted imaging beam to the image chip.

As shown in FIG. 14, the method 2000 may include the following steps:

Step 2100: The image chip generates a digital image based on the imaging beam emitted from the first rotary flat lens.

Step 2200: The first processing module detects an angle by which the lens module rotates around a first direction.

Step 2300: The first processing module adjusts, by using the second control module and based on the angle by which the lens module rotates around the first direction, an angle by which the first rotary flat lens rotates around the first direction, to adjust an angle by which the imaging beam that comes from the imaging lens deflects when passing through the first rotary flat lens, so as to compensate for vibration caused by the angle by which the lens module rotates around the first direction, where the first direction is perpendicular to an optical axis of the imaging lens.

Optionally, the lens module further includes a transparent second rotary flat lens and a third control module. The second rotary flat lens is located between the imaging lens and the image chip, and is configured to transmit the imaging beam emitted by the first rotary flat lens or the imaging beam that comes from the imaging lens.

The method 2000 further includes:

detecting, by the first processing module, an angle by which the lens module rotates around a second direction; and adjusting, by the first processing module by using the third control module and based on the angle by which the lens module rotates around the second direction, an angle by which the second rotary flat lens rotates around the second direction, to adjust an angle by which the imaging beam emitted from the first rotary flat lens or the imaging beam that comes from the imaging lens deflects when passing through the second rotary flat lens, so as to compensate for vibration caused by the angle by which the lens module rotates around the second direction, where the second direction is perpendicular to the first direction, and the second direction is perpendicular to the optical axis of the imaging lens.

Optionally, the lens module further includes a liquid lens and a first control module. The liquid lens is located between the imaging lens and the image chip, and is configured to refract the imaging beam that comes from the imaging lens or the imaging beam emitted from the first rotary flat lens, and emit a refracted imaging beam to the image chip. The liquid lens includes a transparent first flat lens and a transparent second flat lens that are parallel to each other. A transparent liquid object is filled between the first flat lens and the second flat lens. The first flat lens and the second flat lens are perpendicular to the optical axis of the imaging lens. The imaging beam that comes from the imaging lens or the imaging beam emitted from the first rotary flat lens is emitted from the first flat lens to the liquid lens. The imaging beam refracted by the liquid lens is emitted from the second flat lens. Refractive indexes of the first flat lens, the second flat lens, and the liquid object are greater than 1.

The method 2000 further includes:

adjusting, by the first processing module, a distance between the first flat lens and the second flat lens by using the first control module and based on definition of the digital image, so as to adjust the definition of the image generated by the image chip. Optionally, the method 2000 further includes: detecting, by the first processing module, the angle by which the lens module rotates around the first direction and/or the angle by which the lens module rotates around the second direction; and adjusting, by the first processing module, the distance between the first flat lens and the second flat lens by using the first control module and based on the angle by which the lens module rotates around the first direction and/or the angle by which the lens module rotates around the second direction, so as to adjust the definition of the image generated by the image chip.

Optionally, the method 2000 further includes:

performing, by the first processing module, image processing on the digital image, where the image processing includes at least noise reduction processing, enhancement processing, and blurring processing.

It should be understood that the foregoing describes in detail specific functions of the modules or units in the lens module and steps performed by the modules or units with reference to FIG. 10 to FIG. 12.

It should be further understood that, in the embodiments and the accompanying drawings shown in this application, for ease of understanding, an example in which a vertical direction is the first direction and a horizontal direction is the second direction is used for description; however, this shall not constitute any limitation on this application. A specific direction corresponding to each of the first direction and the second direction is not particularly limited in this application. Any direction shall fall within the protection scope of this application, provided that the first direction is perpendicular to the second direction, and a plane including the first direction and the second direction is perpendicular to the optical axis.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lens module, comprising:
an imaging lens;
a first control module;
a first processing module;
a liquid lens; and
an image chip, wherein
the liquid lens is located between the imaging lens and the image chip,
the liquid lens is configured to refract an imaging beam that comes from the imaging lens, and emit a refracted imaging beam to the image chip,
the liquid lens comprises:
  a first flat lens; and
  a second flat lens, the first flat lens and the second flat lens are parallel to each other, wherein a transparent liquid object is filled between the first flat lens and the second flat lens, the first flat lens and the second flat lens are perpendicular to an optical axis of the imaging lens, the imaging beam that comes from the imaging lens is emitted from the first flat lens to the liquid lens, the imaging beam refracted by the liquid lens is emitted from the second flat lens, and refractive indexes of the first flat lens, the second flat lens, and the liquid object are greater than 1;
the first control module is configured to adjust a distance between the first flat lens and the second flat lens;
the image chip is configured to generate a digital image based on the imaging beam refracted by the liquid lens; and
the first processing module is configured to adjust the distance between the first flat lens and the second flat lens by using the first control module and based on a definition of the digital image, so as to adjust the definition of the digital image generated by the image chip.

2. The lens module according to claim 1, further comprising:
a transparent first rotary flat lens, located between the imaging lens and the image chip, and configured to transmit the imaging beam refracted by the liquid lens; and
a second control module, configured to adjust an angle by which the first rotary flat lens rotates around a first direction, so as to adjust an angle by which the imaging beam refracted by the liquid lens deflects when passing through the first rotary flat lens, wherein the first direction is perpendicular to the optical axis of the imaging lens; and
the first processing module is further configured to detect an angle by which the lens module rotates around the first direction, and adjust, by using the second control module and based on the angle by which the lens module rotates around the first direction, the angle by which the first rotary flat lens rotates around the first direction, so as to compensate for vibration caused by the angle by which the lens module rotates around the first direction.

3. The lens module according to claim 2, further comprising:
a transparent second rotary flat lens, located between the imaging lens and the image chip, and configured to transmit the imaging beam refracted by the liquid lens; and
a third control module, configured to adjust an angle by which the second rotary flat lens rotates around a second direction, so as to adjust an angle by which the imaging beam refracted by the liquid lens deflects when passing through the second rotary flat lens, wherein the second direction is perpendicular to the optical axis of the imaging lens, and the second direction is perpendicular to the first direction, wherein
the first processing module is further configured to detect an angle by which the lens module rotates around the second direction, and adjust, by using the third control module and based on the angle by which the lens module rotates around the second direction, the angle by which the second rotary flat lens rotates around the second direction, so as to compensate for vibration caused by the angle by which the lens module rotates around the second direction.

4. A lens module, comprising:
an imaging lens;
a transparent first rotary flat lens;
an image chip;
a first processing module; and
a second control module, wherein the first rotary flat lens is located between the imaging lens and the image chip, and is configured to transmit an imaging beam that comes from the imaging lens, and emit the imaging beam that passes through the first rotary flat lens to the image chip;

the image chip is configured to generate a digital image based on the imaging beam emitted from the first rotary flat lens;

the second control module is configured to adjust an angle by which the first rotary flat lens rotates around a first direction, so as to adjust an angle by which the imaging beam that comes from the imaging lens deflects when passing through the first rotary flat lens, wherein the first direction is perpendicular to an optical axis of the imaging lens; and the first processing module is configured to detect an angle by which the lens module rotates around the first direction, and adjust, by using the second control module and based on the angle by which the lens module rotates around the first direction, the angle by which the first rotary flat lens rotates around the first direction, so as to compensate for vibration caused by the angle by which the lens module rotates around the first direction.

5. The lens module according to claim 4, further comprising:

a second rotary flat lens, located between the imaging lens and the image chip, and configured to transmit the imaging beam emitted from the first rotary flat lens or the imaging beam that comes from the imaging lens; and a third control module, configured to adjust an angle by which the second rotary flat lens rotates around a second direction, so as to adjust an angle by which the imaging beam emitted from the first rotary flat lens or the imaging beam that comes from the imaging lens deflects when passing through the second rotary flat lens, wherein the second direction is perpendicular to the first direction, and the second direction is perpendicular to the optical axis of the imaging lens; and the first processing module is further configured to detect an angle by which the lens module rotates around the second direction, and adjust, by using the third control module and based on the angle by which the lens module rotates around the second direction, the angle by which the second rotary flat lens rotates around the second direction, so as to compensate for vibration caused by the angle by which the lens module rotates around the second direction.

6. The lens module according to claim 4, further comprising:

a liquid lens, located between the imaging lens and the image chip, and configured to refract the imaging beam that comes from the imaging lens or the imaging beam emitted from the first rotary flat lens, and emit a refracted imaging beam to the image chip, wherein the liquid lens comprises:

a first flat lens; and a second flat lens, the first flat lens and the second flat lens are parallel to each other, wherein a transparent liquid object is filled between the first flat lens and the second flat lens, the first flat lens and the second flat lens are perpendicular to the optical axis of the imaging lens, the imaging beam that comes from the imaging lens or the imaging beam emitted from the first rotary flat lens is emitted from the first flat lens to the liquid lens, the imaging beam refracted by the liquid lens is emitted from the second flat lens, and refractive indexes of the first flat lens, the second flat lens, and the liquid object are greater than 1;

the first control module is configured to adjust a distance between the first flat lens and the second flat lens;

the first processing module is further configured to adjust the distance between the first flat lens and the second flat lens by using the first control module and based on a definition of the digital image, so as to adjust the definition of the digital image generated by the image chip.

7. The lens module according to claim 1 wherein the lens module is implemented in a terminal device.

8. A lens module control method, applied to a lens module, wherein the lens module comprises an imaging lens, a liquid lens, an image chip, a first processing module, and a first control module, wherein the liquid lens is located between the imaging lens and the image chip, and is configured to refract an imaging beam that comes from the imaging lens, and emit a refracted imaging beam to the image chip, the liquid lens comprises a first flat lens and a second flat lens, the first flat lens and the second flat lens are parallel to each other, a transparent liquid object is filled between the first flat lens and the second flat lens, the first flat lens and the second flat lens are perpendicular to an optical axis of the imaging lens, the imaging beam that comes from the imaging lens is emitted from the first flat lens to the liquid lens, the imaging beam refracted by the liquid lens is emitted from the second flat lens, and refractive indexes of the first flat lens, the second flat lens, and the liquid object are greater than 1; and the lens module control method comprises:

generating, by the image chip, a digital image based on the imaging beam refracted by the liquid lens; and adjusting, by the first processing module, a distance between the first flat lens and the second flat lens by using the first control module and based on a definition of the digital image, so as to adjust the definition of the digital image generated by the image chip.

9. The method according to claim 8, wherein the lens module further comprises a transparent first rotary flat lens and a second control module, wherein the first rotary flat lens is located between the imaging lens and the image chip, and is configured to transmit the imaging beam refracted by the liquid lens; and the method further comprises:

detecting, by the first processing module, an angle by which the lens module rotates around the first direction; and adjusting, by the first processing module by using the second control module and based on the angle by which the lens module rotates around the first direction, an angle by which the first rotary flat lens rotates around the first direction, to adjust an angle by which the imaging beam refracted by the liquid lens deflects when passing through the first rotary flat lens, so as to compensate for vibration caused by the angle by which the lens module rotates around the first direction, wherein the first direction is perpendicular to the optical axis of the imaging lens.

10. The method according to claim 9, wherein the lens module further comprises a second rotary flat lens and a third control module, wherein the second rotary flat lens is located between the imaging lens and the image chip, and is configured to transmit the imaging beam refracted by the liquid lens, and the method further comprises:

detecting, by the first processing module, an angle by which the lens module rotates around the second direction; and adjusting, by the first processing module by using the third control module and based on the angle by which the lens module rotates around the second direction, an angle by which the second rotary flat lens rotates around the second direction, to adjust an angle by which the imaging beam refracted by the liquid lens deflects when passing through the second rotary flat lens, so as to compensate for vibration caused by the angle by which the lens module rotates around the second direction, wherein the second direction is perpendicular to the optical axis of the imaging lens, and the second direction is perpendicular to the first direction.

11. A lens module control method, applied to a lens module, wherein the lens module comprises an imaging lens, a first rotary flat lens, an image chip, and a second control module, wherein the first rotary flat lens is located between the imaging lens and the image chip, and is configured to transmit an imaging beam that comes from the imaging lens, emit the imaging beam that passes through the first rotary flat lens to the image chip, refract the imaging beam, and emit a refracted imaging beam to the image chip, and the method comprises:

generating, by the image chip, a digital image based on the imaging beam emitted from the first rotary flat lens;

detecting, by the first processing module, an angle by which the lens module rotates around the first direction; and adjusting, by the first processing module by using the second control module and based on the angle by which the lens module rotates around the first direction, an angle by which the first rotary flat lens rotates around the first direction, to adjust an angle by which the imaging beam that comes from the imaging lens deflects when passing through the first rotary flat lens, so as to compensate for vibration caused by the angle by which the lens module rotates around the first direction, wherein the first direction is perpendicular to an optical axis of the imaging lens.

12. The method according to claim 11, wherein the lens module further comprises: a second rotary flat lens and a third control module, wherein the second rotary flat lens is located between the imaging lens and the image chip, and is configured to transmit the imaging beam emitted from the first rotary flat lens or the imaging beam that comes from the imaging lens, and the method further comprises:

detecting, by the first processing module, an angle by which the lens module rotates around the second direction; and adjusting, by the first processing module by using the third control module and based on the angle by which the lens module rotates around the second direction, an angle by which the second rotary flat lens rotates around the second direction, to adjust an angle by which the imaging beam emitted from the first rotary flat lens or the imaging beam that comes from the imaging lens deflects when passing through the second rotary flat lens, so as to compensate for vibration caused by the angle by which the lens module rotates around the second direction, wherein the second direction is perpendicular to the first direction, and the second direction is perpendicular to the optical axis of the imaging lens.

13. The method according to claim 11, wherein the lens module further comprises a liquid lens and a first control module, wherein the liquid lens is located between the imaging lens and the image chip, and is configured to refract the imaging beam that comes from the imaging lens or the imaging beam emitted from the first rotary flat lens, and emit a refracted imaging beam to the image chip, the liquid lens comprises a transparent first flat lens and a transparent second flat lens that are parallel to each other, a transparent liquid object is filled between the first flat lens and the second flat lens, the first flat lens and the second flat lens are perpendicular to the optical axis of the imaging lens, the imaging beam that comes from the imaging lens or the imaging beam emitted from the first rotary flat lens is emitted from the first flat lens to the liquid lens, the imaging beam refracted by the liquid lens is emitted from the second flat lens, and refractive indexes of the first flat lens, the second flat lens, and the liquid object are greater than 1; and the method further comprises:

adjusting, by the first processing module, a distance between the first flat lens and the second flat lens by using the first control module and based on a definition of the digital image, so as to adjust the definition of the digital image generated by the image chip.

14. The method according to claim 8 implemented via a lens module, comprising:

a memory, configured to store a computer program; and a processor, configured to execute the computer program stored in the memory, so that the lens module performs:

generating, by the image chip, the digital image based on the imaging beam refracted by the liquid lens; and adjusting, by the first processing module, the distance between the first flat lens and the second flat lens by using the first control module and based on the definition of the digital image, so as to adjust the definition of the digital image generated by the image chip.

15. The method according to claim 11 implemented via a lens module, comprising:

a memory, configured to store a computer program; and a processor, configured to execute the computer program stored in the memory, so that the lens module performs:

generating, by the image chip, the digital image based on the imaging beam emitted from the first rotary flat lens;

detecting, by the first processing module, the angle by which the lens module rotates around the first direction; and adjusting, by the first processing module by using the second control module and based on the angle by which the lens module rotates around the first direction, the angle by which the first rotary flat lens rotates around the first direction, to adjust the angle by which the imaging beam that comes from the imaging lens deflects when passing through the first rotary flat lens, so as to compensate for vibration caused by the angle by which the lens module rotates around the first direction, wherein the first direction is perpendicular to an optical axis of the imaging lens.

\* \* \* \* \*